United States Patent
Hagimoto

(10) Patent No.: US 10,168,657 B2
(45) Date of Patent: Jan. 1, 2019

(54) LUBRICANT SUPPLY DEVICE AND IMAGE FORMING DEVICE

(71) Applicant: KONICA MINOLTA, INC., Chiyoda-ku, Tokyo (JP)

(72) Inventor: Noritoshi Hagimoto, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 20 days.

(21) Appl. No.: 15/463,313

(22) Filed: Mar. 20, 2017

(65) Prior Publication Data
US 2017/0285555 A1   Oct. 5, 2017

(30) Foreign Application Priority Data

Mar. 31, 2016 (JP) .................. 2016-072136

(51) Int. Cl.
G03G 21/00 (2006.01)
F16N 15/00 (2006.01)
F16N 25/00 (2006.01)

(52) U.S. Cl.
CPC ......... G03G 21/0094 (2013.01); F16N 15/00 (2013.01); F16N 25/00 (2013.01); *G03G 2215/0132* (2013.01)

(58) Field of Classification Search
CPC .................................................. G03G 21/0094
USPC ......................................................... 399/346
See application file for complete search history.

(56) References Cited

U.S. PATENT DOCUMENTS

| | | | |
|---|---|---|---|
| 2007/0068738 A1* | 3/2007 | Kawahara | G03G 21/0005 184/99 |
| 2009/0042117 A1* | 2/2009 | Nakamura | G03G 15/0233 430/66 |
| 2011/0217101 A1* | 9/2011 | Okamoto | G03G 21/00 399/346 |
| 2011/0268466 A1* | 11/2011 | Kimura | G03G 15/757 399/71 |
| 2012/0134700 A1* | 5/2012 | Yamaki | G03G 15/161 399/71 |

FOREIGN PATENT DOCUMENTS

| | | |
|---|---|---|
| JP | 11-212372 A | 6/1999 |
| JP | 2000-338733 A | 12/2000 |

(Continued)

*Primary Examiner* — Walter L Lindsay, Jr.
*Assistant Examiner* — Philip Marcus T Fadul
(74) *Attorney, Agent, or Firm* — Buchanan Ingersoll & Rooney PC

(57) ABSTRACT

A lubricant supply device for supplying lubricant to an image carrier of an image forming device, the lubricant supply device including: a block of solid lubricant; a lubricant supply member scraping lubricant from the block and supplying the lubricant to the image carrier; and a spring applying a biasing force to the block in a second direction inclined with respect to a first direction from the block towards the lubricant supply member, a component of the biasing force in the first direction pushing the block against the lubricant supply member. Positions of the spring and the block relative to each other are such that, as the block decreases due to the scraping by the lubricant supply member, the angle between the biasing force and the first direction decreases and the component of the biasing force in the first direction increases.

20 Claims, 14 Drawing Sheets

(56) References Cited

FOREIGN PATENT DOCUMENTS

| JP | 2003-330320 | A |   | 11/2003 |
|----|-------------|---|---|---------|
| JP | 2007-293240 | A |   | 11/2007 |
| JP | 2009-217034 | A |   | 9/2009  |
| JP | 2011-180395 | A |   | 9/2011  |
| JP | 2012027135  | A | * | 2/2012  |
| JP | 2012-058462 | A |   | 3/2012  |
| JP | 2014-092687 | A |   | 5/2014  |

* cited by examiner

<Comparative example 1>

<Comparative example 2>

LUBRICANT SUPPLY DEVICE AND IMAGE FORMING DEVICE

This application is based on applications No. 2016-72136 filed in Japan, the contents of which are hereby incorporated by reference.

BACKGROUND OF THE INVENTION

(1) Field of the Invention

The present invention relates to lubricant supply devices that supply lubricant to image carriers and to image forming devices.

(2) Related Art

An image forming device such as an electrophotographic printer forms an electrostatic latent image by charging a photosensitive drum (as an example of a rotating image carrier) and exposing the charged photosensitive drum; forms a toner image by developing the electrostatic latent image formed on the photosensitive drum; transfers the toner image to a recording sheet and cleans residue such as toner that remains on the photosensitive drum without being transferred to the recording sheet by use of a cleaner such as a cleaning blade.

In many such image forming devices, in order to improve cleaning, lubricant is scraped off from a block of solid lubricant by a brush roller and supplied to the photosensitive drum.

Patent application JP 2009-217034 discloses a configuration in which a brush roller, block of solid lubricant, and spring are arranged in this order from a photosensitive drum, pressure from the spring pushes the block of solid lubricant against the brush roller, and the brush roller scrapes lubricant from the block of solid lubricant.

Further, patent application JP 2003-330320 discloses a configuration in which a brush roller, block of solid lubricant, spring, and cam are arranged in this order from a photosensitive drum, and rotation of the cam adds to the pressure from the spring that pushes the block of solid lubricant against the brush roller, increasing an amount of lubricant supplied to the photosensitive drum.

According to the configuration of JP 2009-217034, as the block of solid lubricant decreases due to scraping thereof over a long period from beginning to end of the life of the device, the force of the spring pressing the block of solid lubricant against the brush member decreases. When the amount of lubricant scraped by the brush member decreases due to this decrease in pressing force, the amount of lubricant supplied to the photosensitive drum decreases as the end of the life of the device is approached.

Normally, wear of the cleaning blade advances as the end of the life of the device is approached, and cleaning performance deteriorates, and therefore cleaning failure may occur if an amount of lubricant supplied to the photosensitive drum decreases towards the end of the life of the device, as in JP 2009-217034.

On the other hand, according to the configuration of JP 2003-330320, supply of lubricant to the photosensitive drum can be increased as the end of the life of the device is approached, but the cam, rotation drive motor, controller for controlling rotation, etc., are required, making configuration complex and greatly increasing costs.

Above are described two configurations to supply lubricant to a photoreceptor, but other configurations are possible. For example, configurations exist that improve cleaning of an intermediate transfer body such as an intermediate transfer belt in an image forming device that uses intermediate transfer, by supplying lubricant to the intermediate transfer body, and the same problems can also occur in such configurations.

SUMMARY OF THE INVENTION

An aim of the present invention is to provide a lubricant supply device and image forming device capable of stabilizing an amount of lubricant supplied to an image carrier such as a photoreceptor over a long period of time with a simple configuration and without a significant cost increase.

The above aim is achieved by a lubricant supply device for supplying lubricant to an image carrier of an image forming device, the lubricant supply device comprising: a block of solid lubricant; a lubricant supply member disposed opposing the block of solid lubricant, the lubricant supply member scraping lubricant from the block of solid lubricant and supplying the lubricant to the image carrier; and a spring that applies a biasing force to the block of solid lubricant in a second direction inclined with respect to a first direction from the block of solid lubricant towards the lubricant supply member, a component of the biasing force in the first direction pushing the block of solid lubricant against the lubricant supply member, wherein positions of the spring and the block of solid lubricant relative to each other are such that, as the block of solid lubricant decreases due to the scraping by the lubricant supply member, the angle between the biasing force and the first direction decreases, and the component of the biasing force in the first direction increases.

BRIEF DESCRIPTION OF THE DRAWINGS

These and the other aims, advantages and features of the invention will become apparent from the following description thereof taken in conjunction with the accompanying drawings which illustrate a specific embodiment of the invention.

IN THE DRAWINGS

Figure 1:
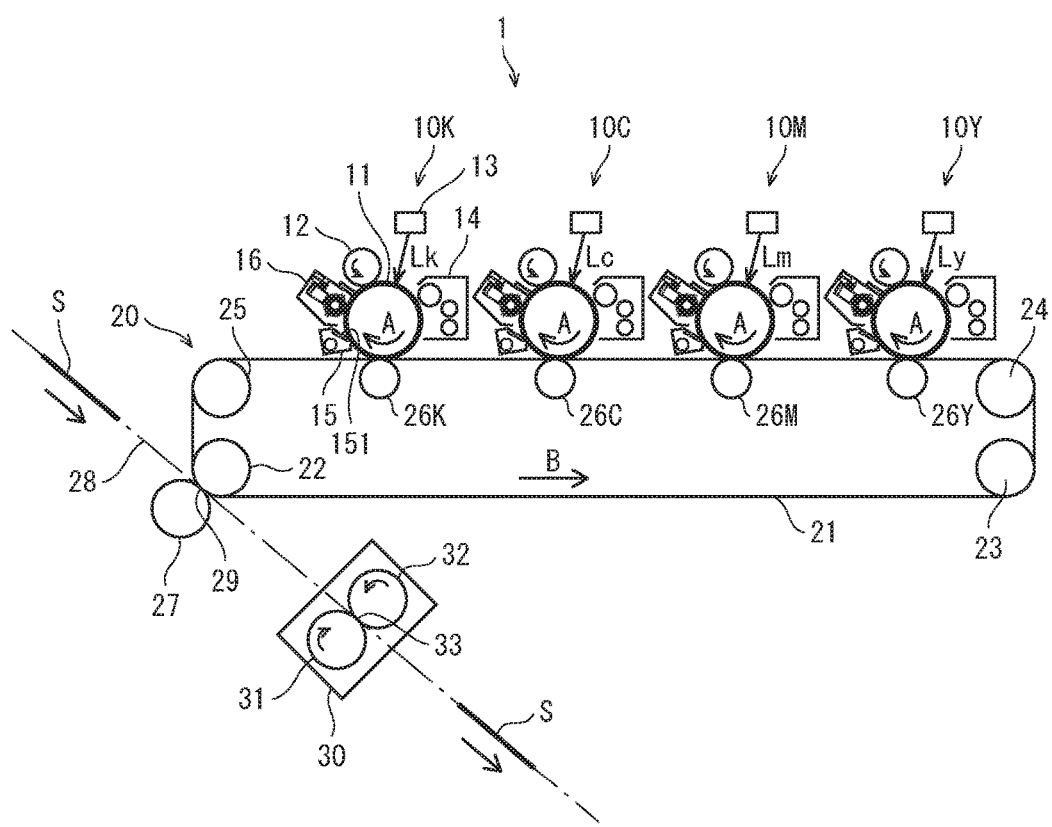

FIG. 1 shows only principal parts of a printer extracted.

Figure 2:
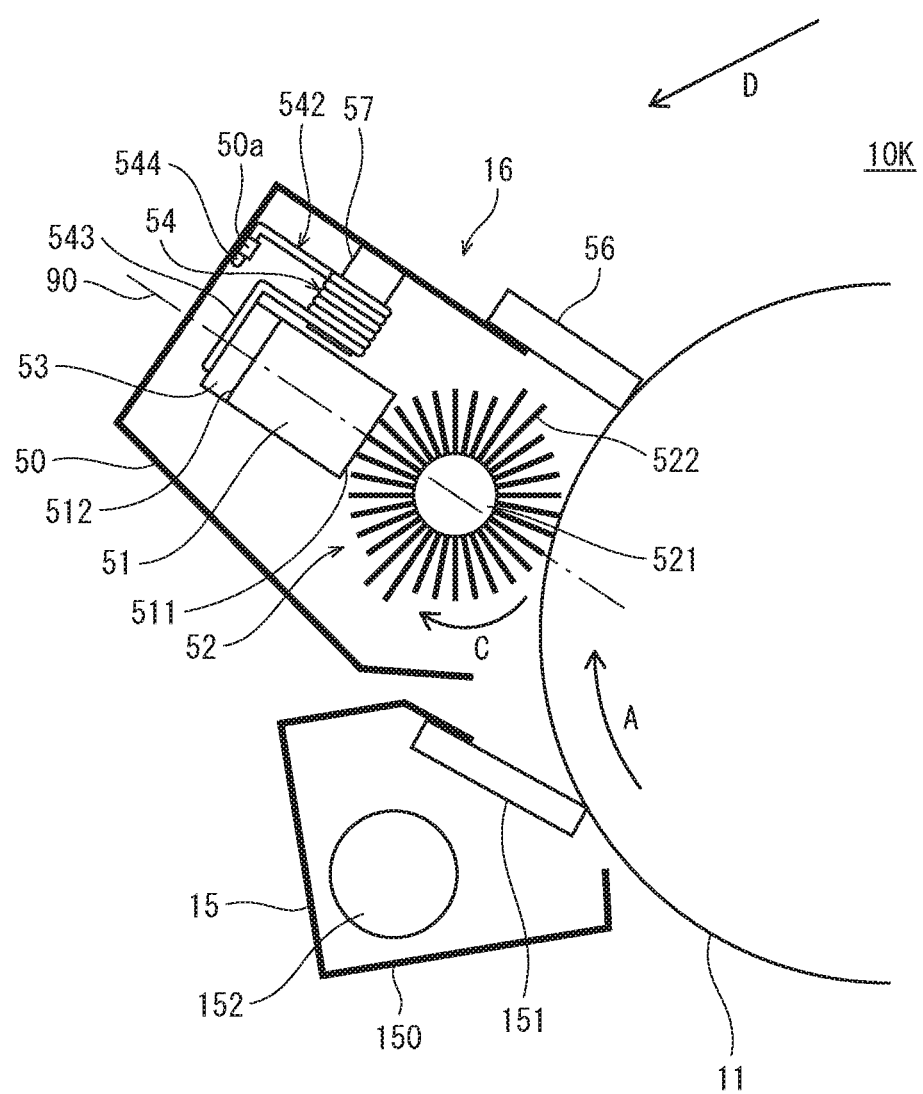

FIG. 2 shows an enlargement of a lubricant supply section of a printer.

Figure 3:
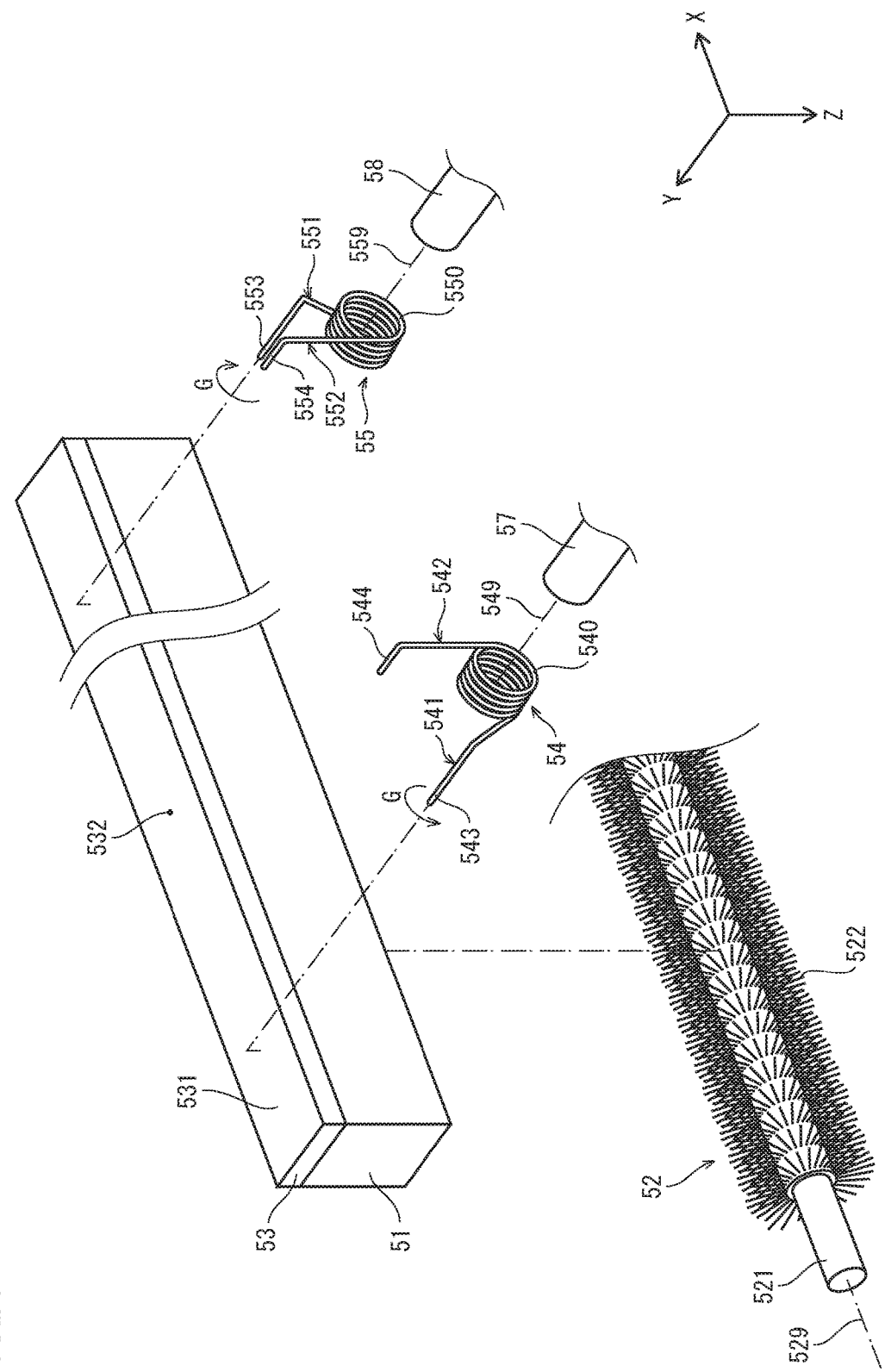

FIG. 3 is an exploded perspective view of a lubricant supply section from a direction of arrow D in FIG. 2.

Figure 4:
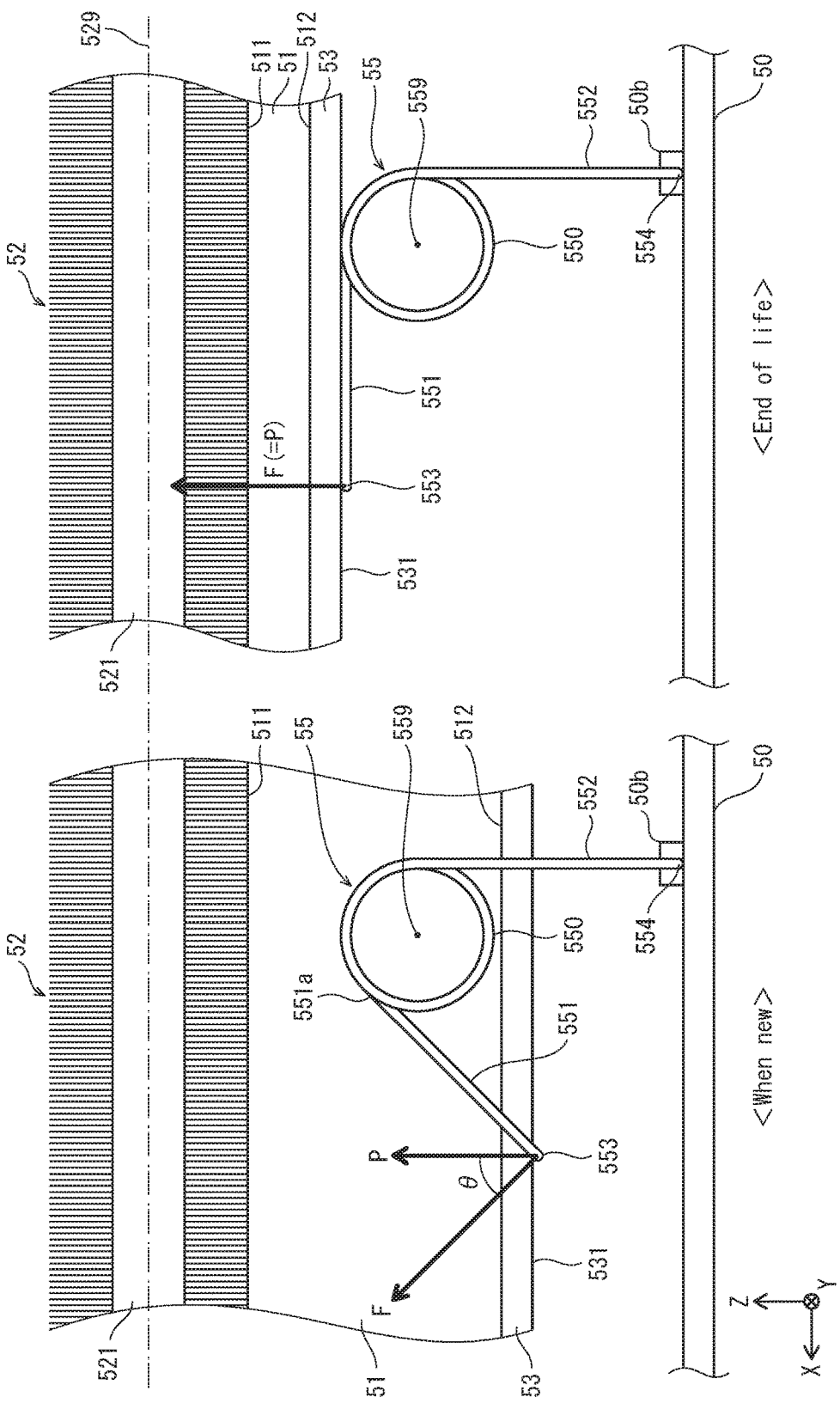

FIG. 4 shows two states in which a biasing force of a torsion coil spring acts on a block of solid lubricant, one at a time of a new block of solid lubricant and the other approaching the end of the life of the block of solid lubricant.

Figure 5:
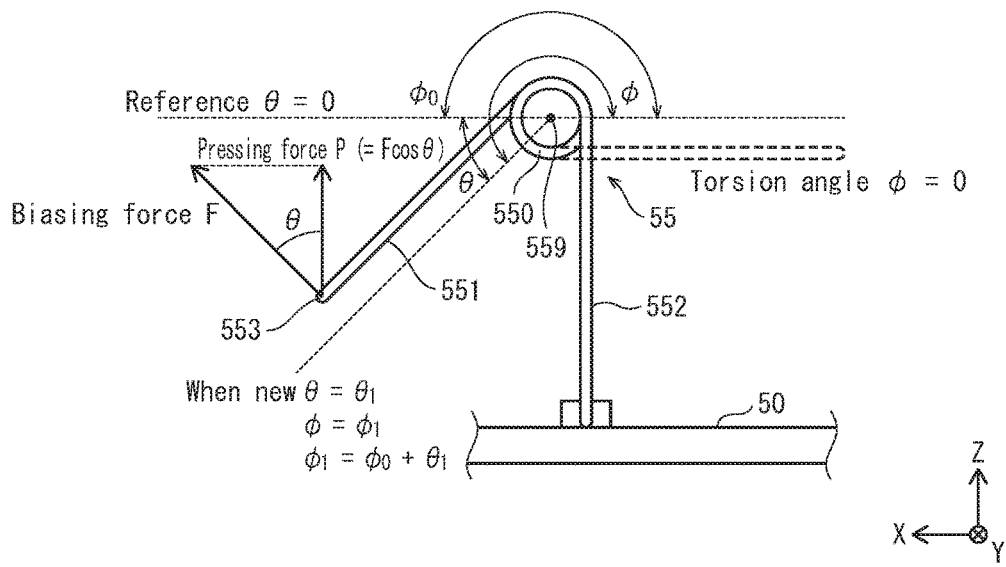

FIG. 5 is a schematic diagram showing a relationship between a torsion angle $\phi$ and an angle $\theta$ of a torsion coil spring.

Figure 6:
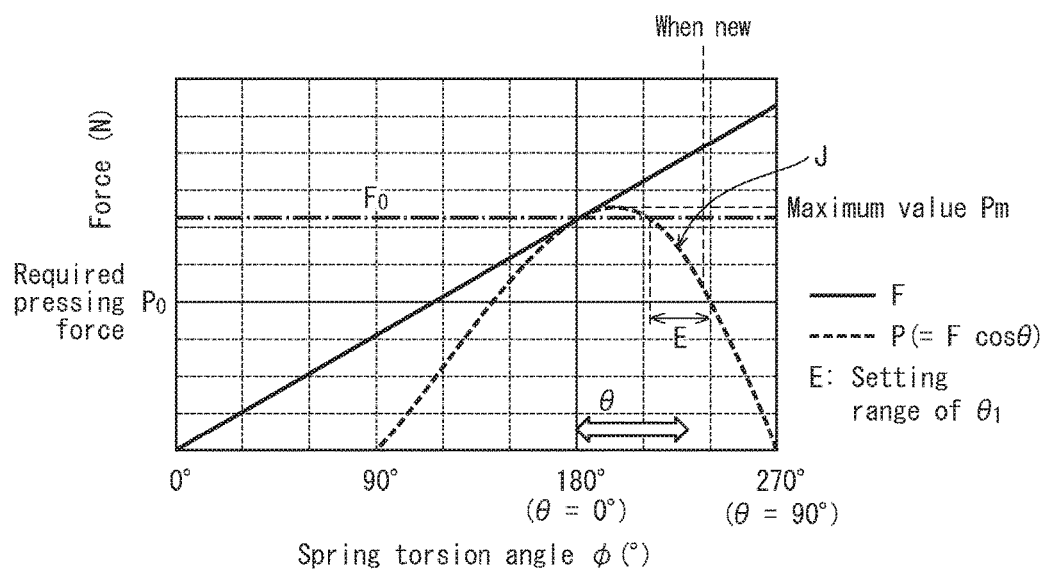

FIG. 6 is a graph showing a relationship between a torsion angle $\phi$, a biasing force F, and a pressing force P, and an example of a setting range of torsion angle when a block of solid lubricant is new in Embodiment 1.

Figure 7A:
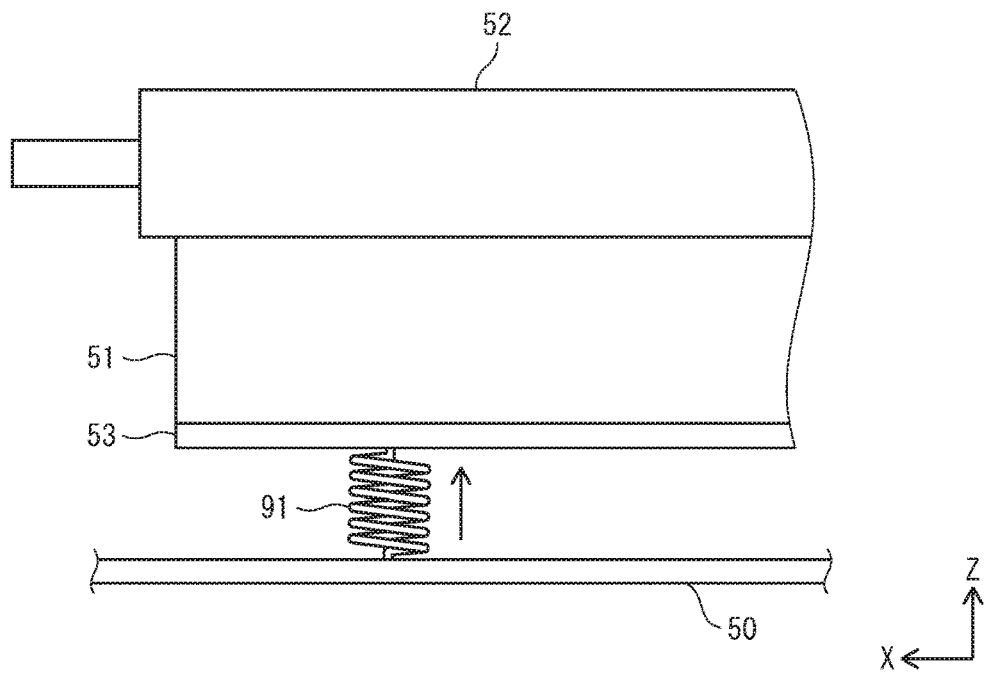
Figure 7B:
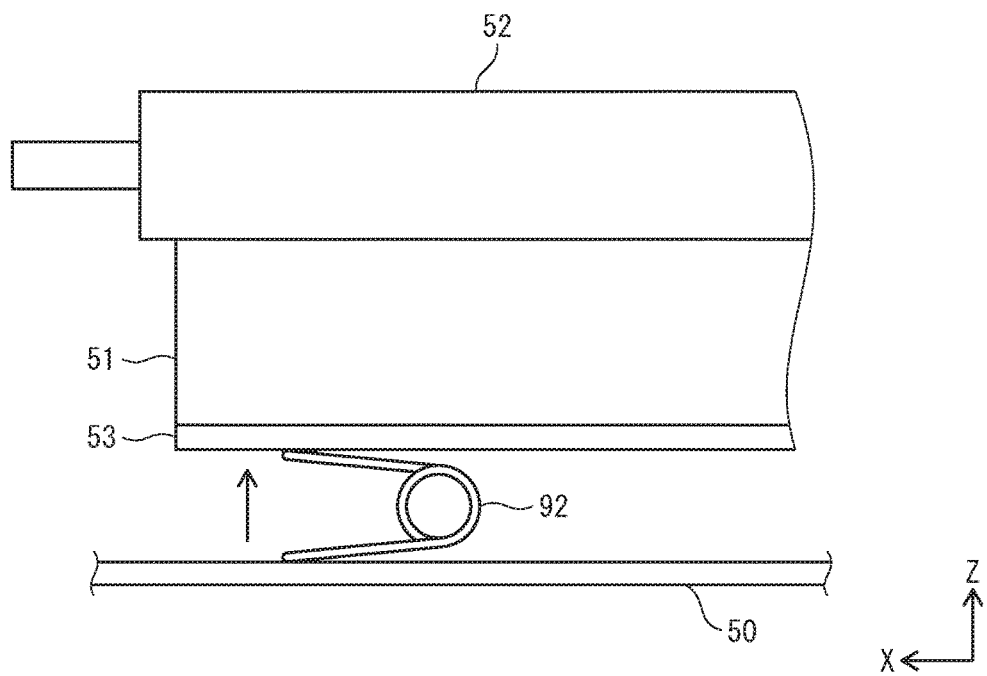

FIG. 7A and FIG. 7B show configurations of comparative examples.

Figure 8A:
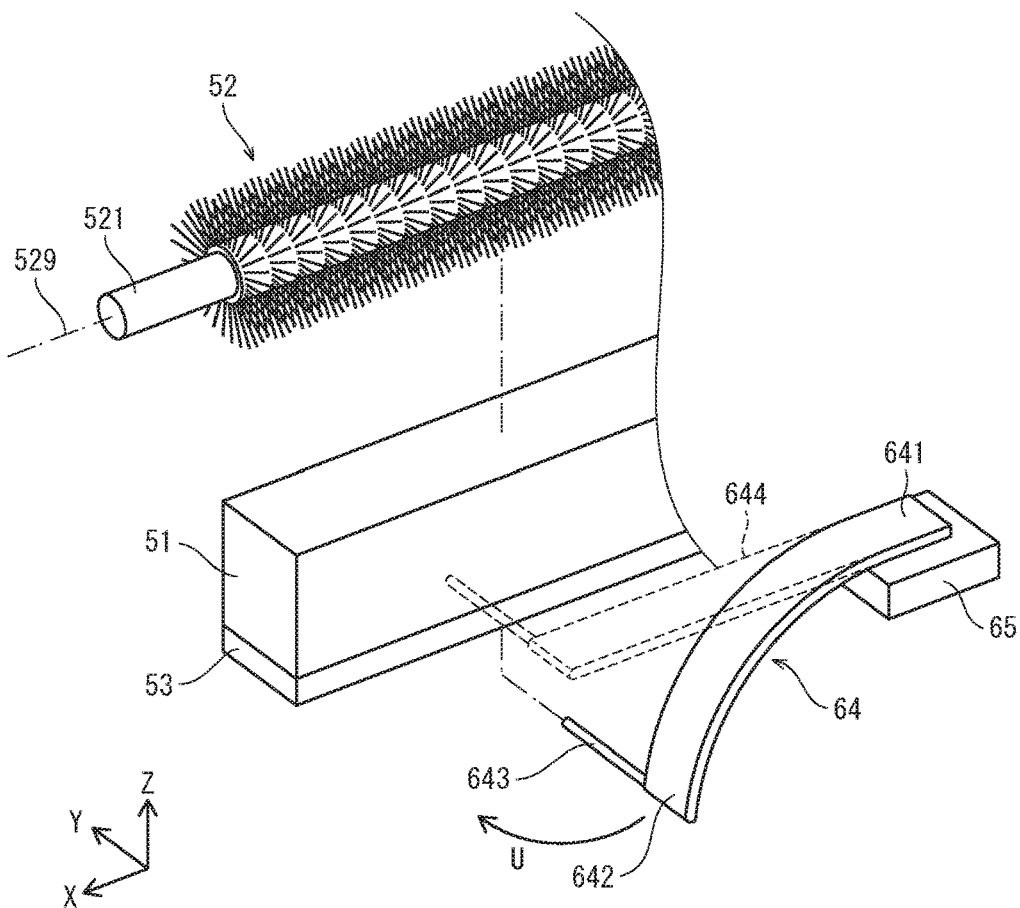
Figure 8B:
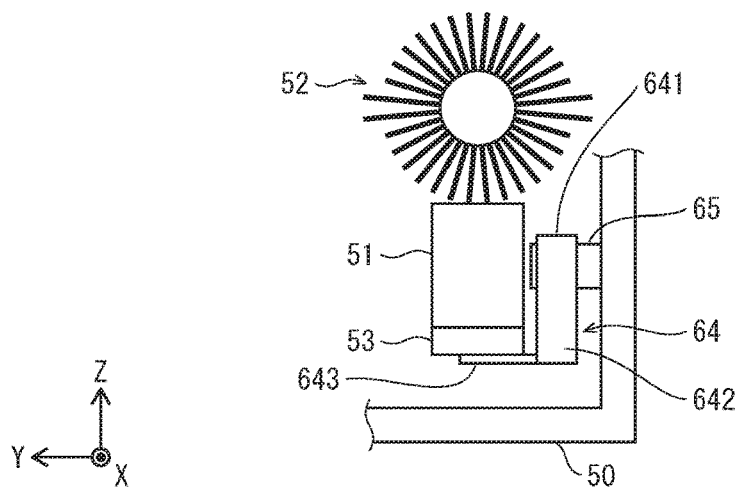

FIG. 8A and FIG. 8B are diagrams for describing a configuration using a leaf spring in Embodiment 2.

Figure 9:
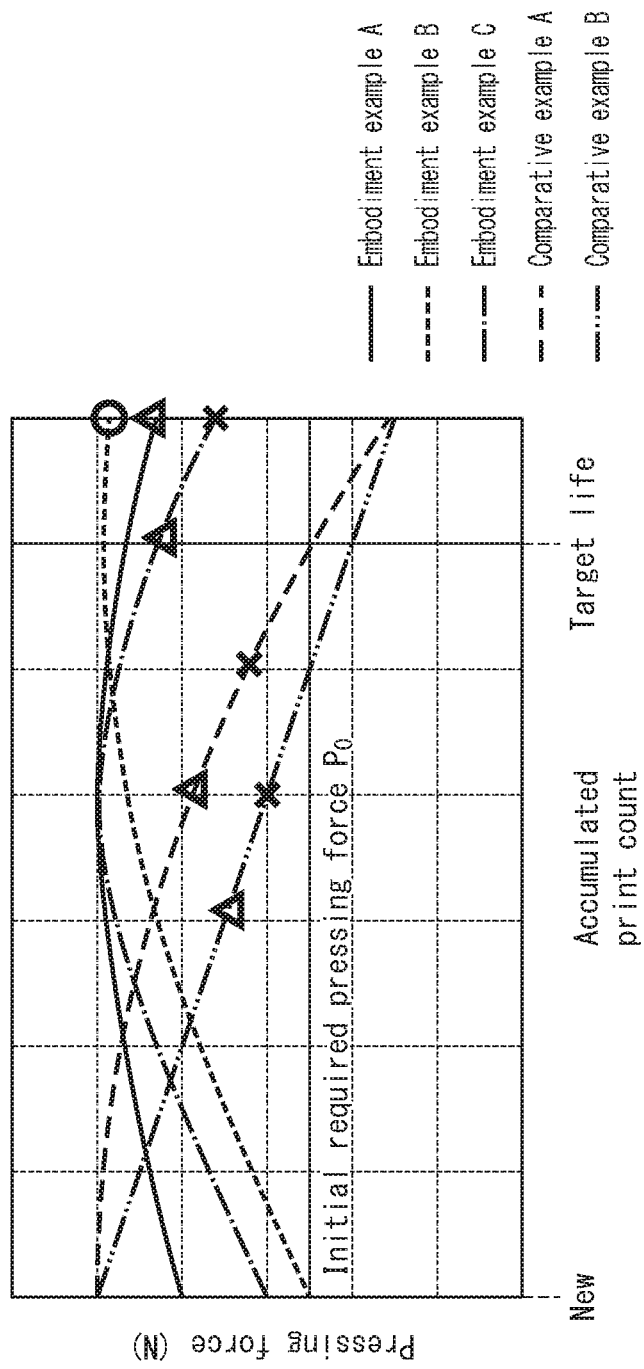

FIG. 9 shows evaluation experiment results for pressing force changes and cleaning performance.

Figure 10A:
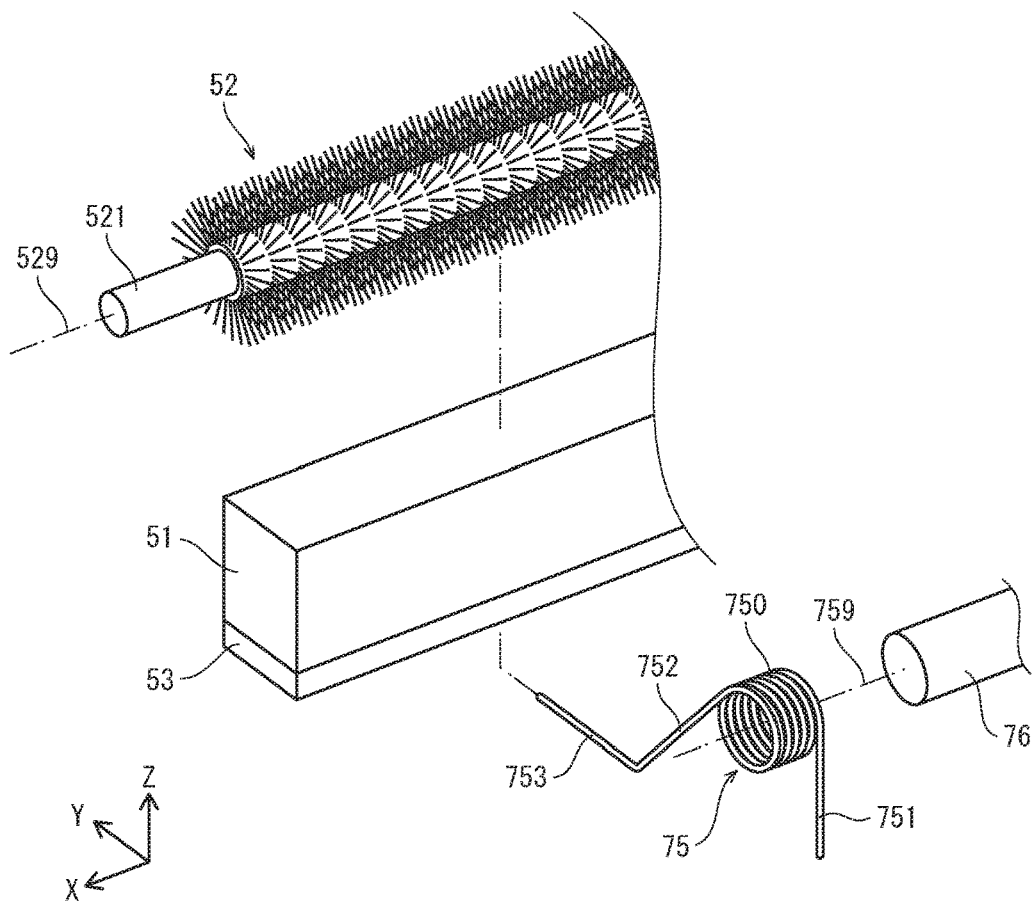
Figure 10B:
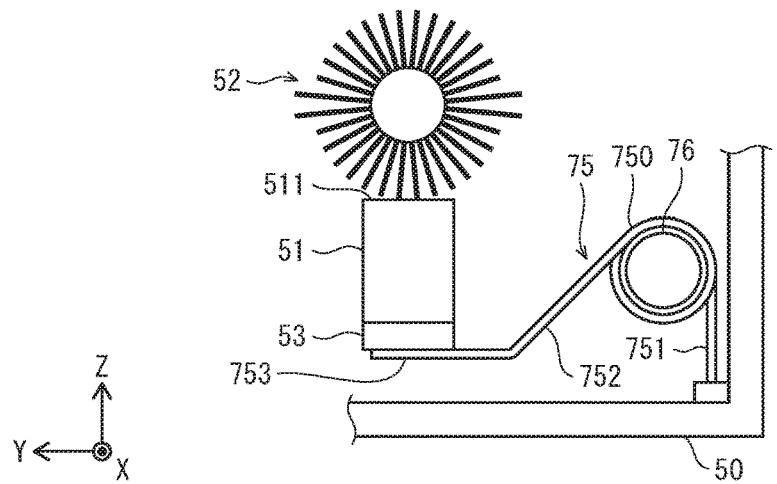

FIG. 10A and FIG. 10B are diagrams for describing a configuration of a modification.

Figure 11A:
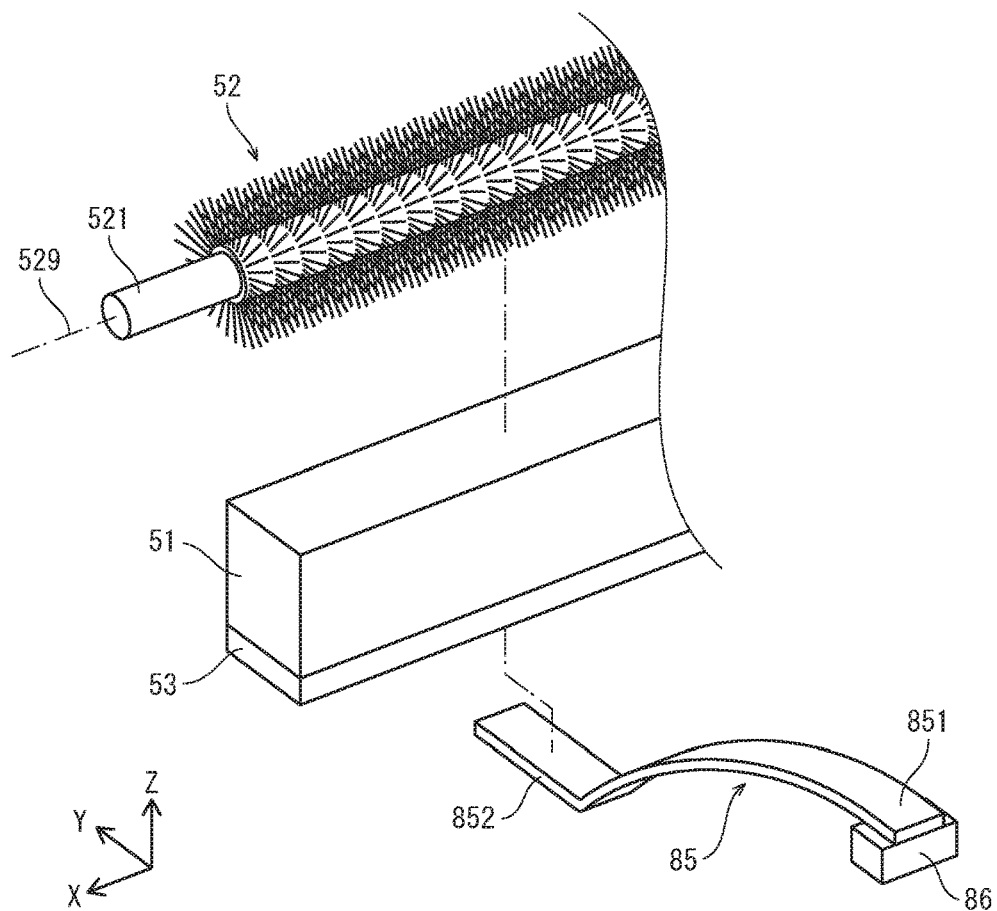
Figure 11B:
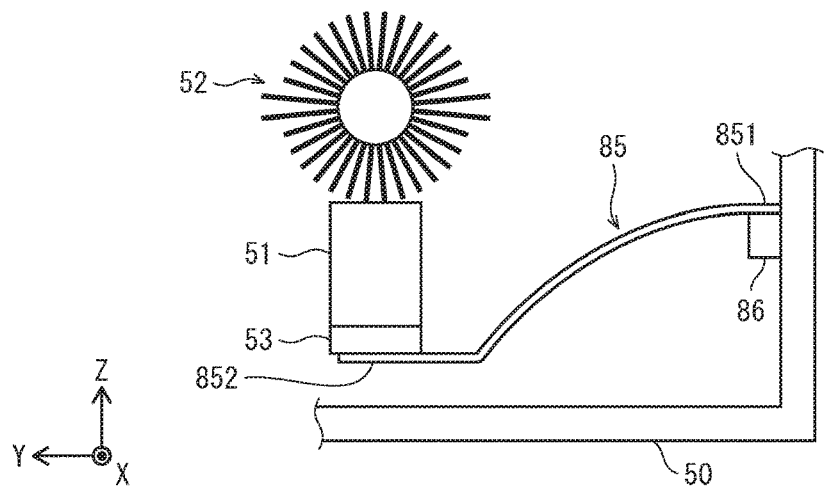

FIG. 11A and FIG. 11B are diagrams for describing a configuration of another modification.

Figure 12:
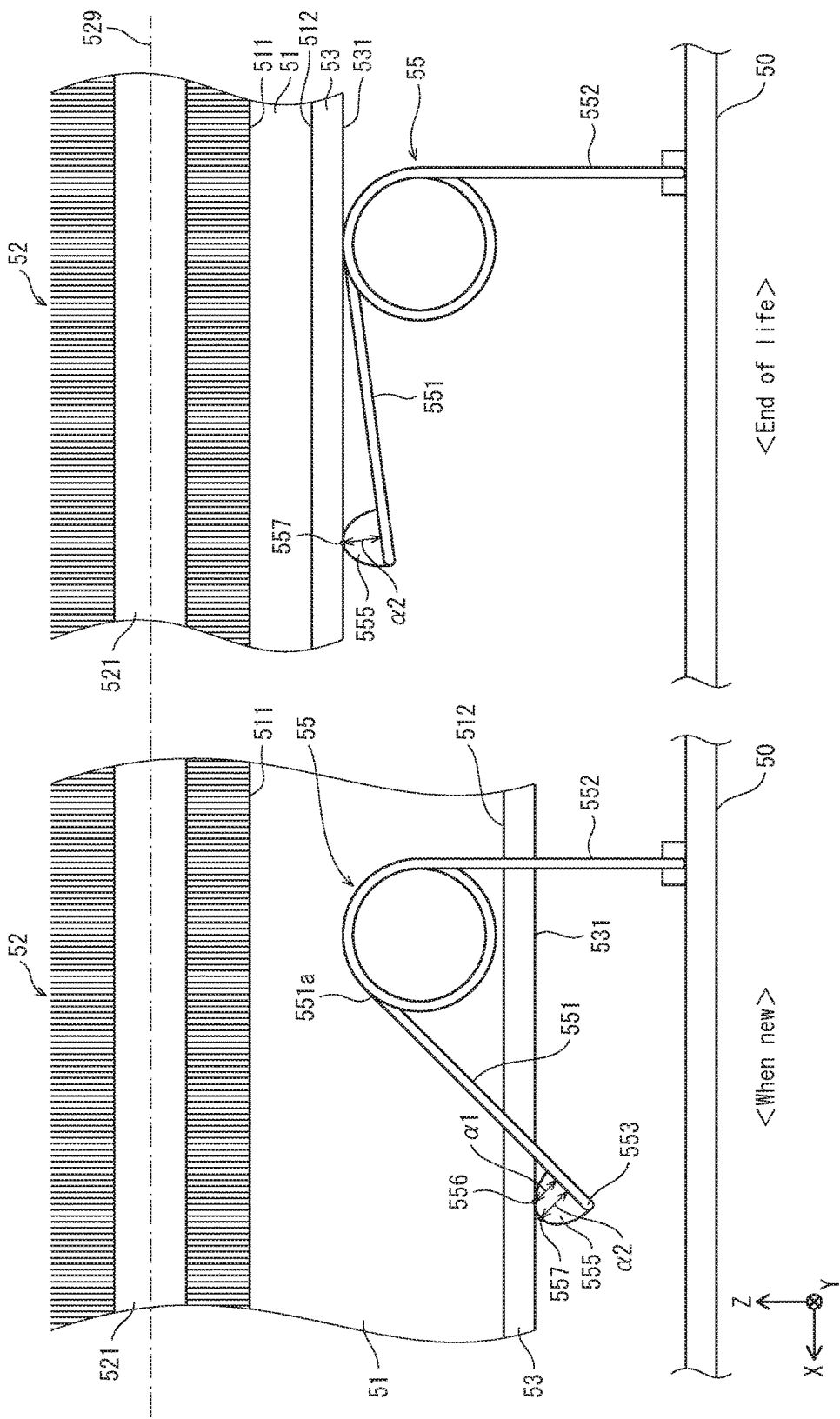

FIG. 12 is a diagram for describing another modification.

Figure 13:
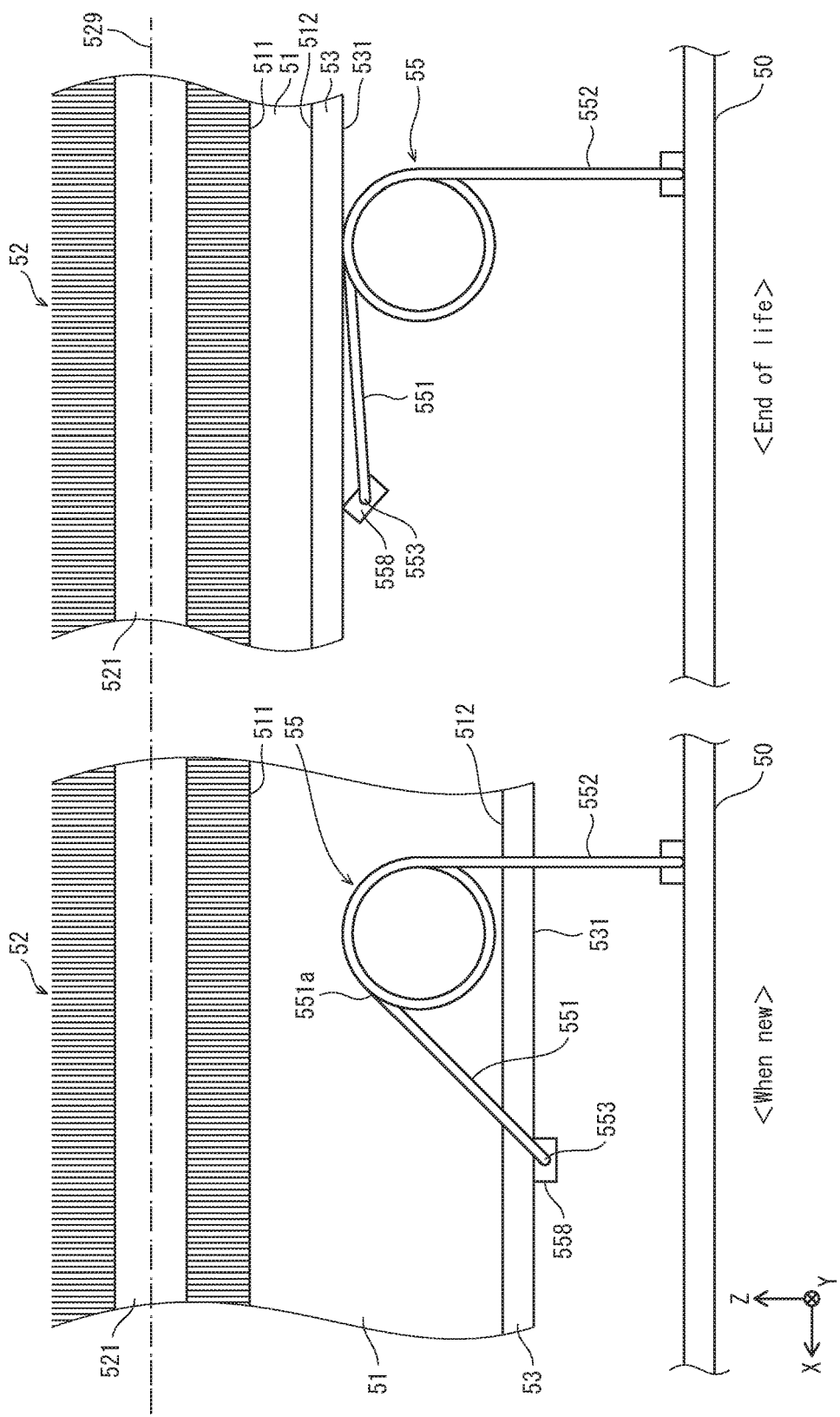

FIG. 13 is a diagram for describing another modification.

Figure 14:
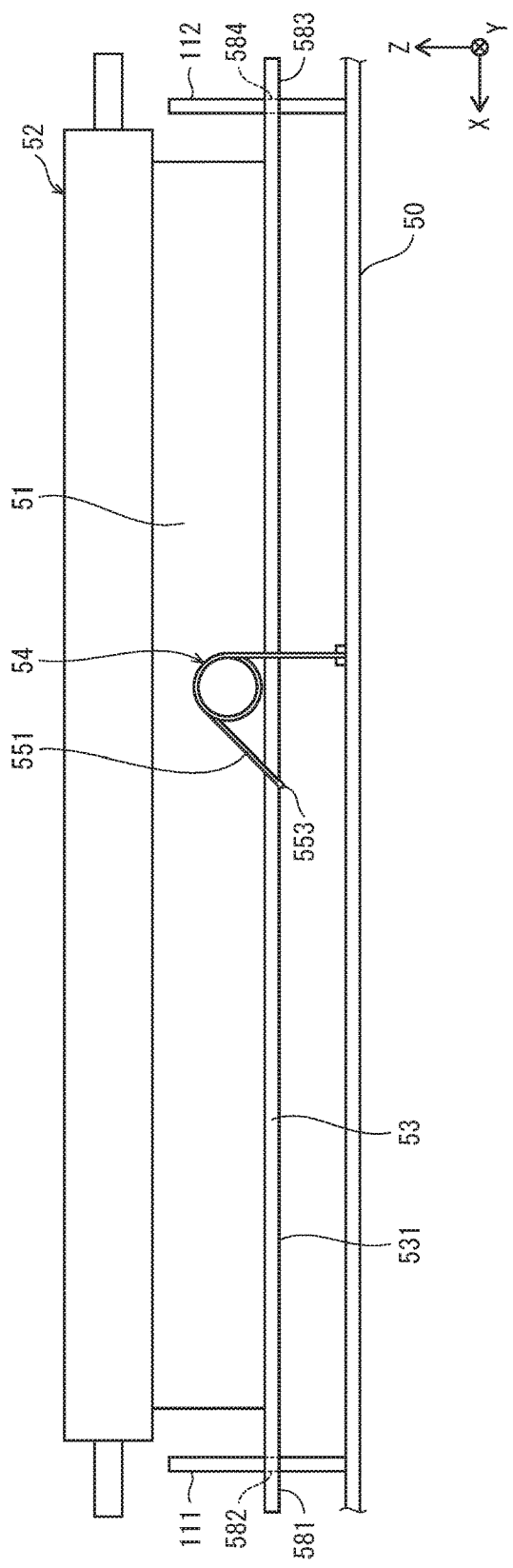

FIG. 14 shows a modification in which one spring is used.

Figure 15A:
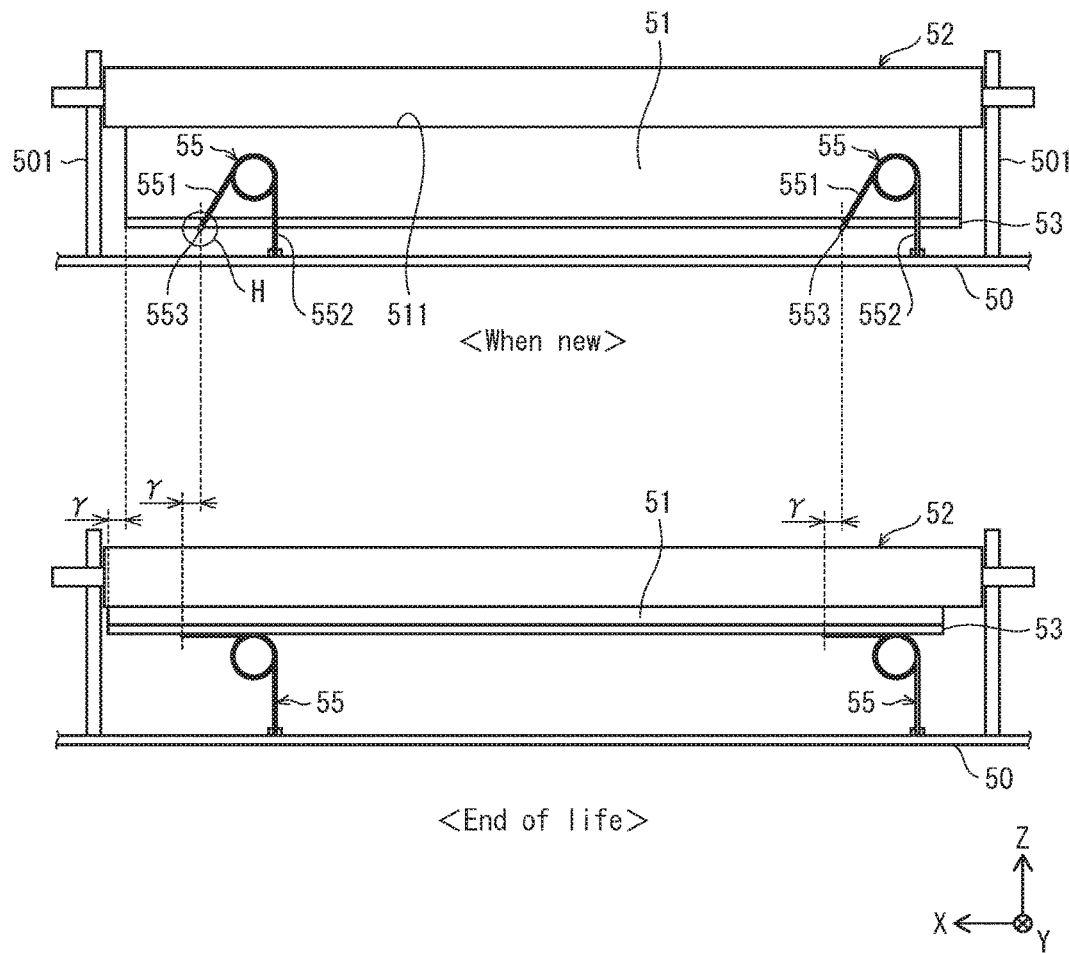
Figure 15B:
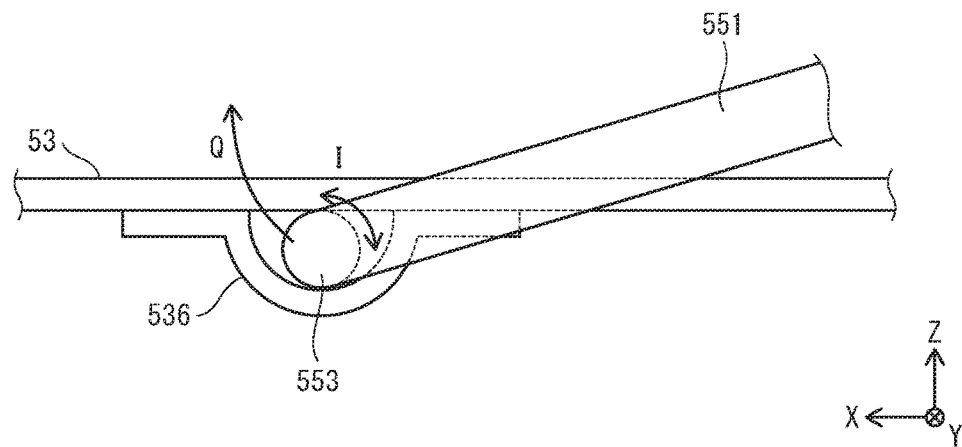

FIG. 15A and FIG. 15B are diagrams for describing a configuration of another modification.

DESCRIPTION OF PREFERRED EMBODIMENTS

The following describes a tandem color printer (hereinafter, "printer") as an example of an embodiment of the lubricant supply device and image forming device pertaining to the present invention.

(1) Printer

FIG. 1 shows only principal parts of a printer extracted.

As shown in FIG. 1, a printer 1 is a printer that forms an image by a publicly-known electrophotographic method, includes imaging units 10Y, 10M, 10C, 10K, an intermediate transfer unit 20, and a fixing unit 30, is connected to a network (for example, a LAN), and upon receiving a print job execution instruction from an external terminal device (not illustrated), executes color image forming from yellow, magenta, cyan, and black colors, based on the instruction. Hereinafter, yellow, magenta, cyan, and black are represented by the letters Y, M, C, and K, and Y, M, C, or K is added to reference signs of components associated with a corresponding color.

The imaging unit 10K includes a photosensitive drum 11 that rotates in a direction indicated by an arrow A ("drum rotation direction A"), and a charging unit 12, an exposure unit 13, a developer unit 14, a cleaning unit 15, and a lubricant supply unit 16 disposed along the drum rotation direction A, and forms a K color toner image on the photosensitive drum 11. The other imaging units 10Y, 10M, 10C have the same configuration, and reference signs thereof are omitted from FIG. 1. Each of the imaging units 10Y, 10M, 10C forms a toner image of a corresponding color on the photosensitive drum 11.

The intermediate transfer unit 20 includes an intermediate transfer belt 21, a drive roller 22, driven rollers 23, 24, 25, primary transfer rollers 26Y, 26M, 26C, 26K, and a secondary transfer roller 27 at a position opposite the drive roller 22 across the intermediate transfer belt 21.

The intermediate transfer belt 21 is tensioned by the drive roller 22, the driven rollers 23, 24, 25, and the primary transfer rollers 26Y, 26M, 26C, 26K, and driven to rotate in the direction indicated by the arrow B.

In the fixing unit 30, a fixing roller 31 and a pressure roller 32 are brought into pressure contact with each other to ensure a fixing nip, and the fixing roller 31 is heated by a heater to maintain a temperature required for fixing.

In such a configuration, a controller (not illustrated) comprehensively controls the imaging units 10Y, 10M, 10C, 10K, the intermediate transfer unit 20, the fixing unit 30, etc., and when an image signal is received from an external terminal device, the following control is performed in order to smoothly execute a job.

That is, the received image signal is converted into Y, M, C, K color image signals, and for each color a drive signal is generated to drive laser diodes (not illustrated) arranged in the exposure unit 13 corresponding to each of the imaging units 10Y, 10M, 10C, 10K. According to the generated drive signal, the exposure unit 13 of each of the imaging units 10Y, 10M, 10C, 10K emits a corresponding laser beam Ly, Lm, Lc, Lk, to perform exposure scanning on each of the photosensitive drums 11.

Prior to receiving this exposure scanning, for each of the imaging units 10Y, 10M, 10C, 10K, the photosensitive drum 11 is uniformly charged by the corresponding charging unit 12, then an electrostatic latent image is formed on a surface of the photosensitive drum 11 by exposure to a corresponding laser beam L.

For each of the imaging units 10Y, 10M, 10C, 10K, the electrostatic latent image on the photosensitive drum 11 is developed by toner from the developer unit 14 to form a toner image. The toner images formed on the photosensitive drums 11 are transferred onto the intermediate transfer belt 21 by electrostatic force acting between the photosensitive drums 11 and the primary transfer rollers 26Y, 26M, 26C, 26K at corresponding positions across the intermediate transfer belt 21.

Image forming operations of each color to each of the photosensitive drums 11 of the imaging units 10Y, 10M, 10C, 10K are executed at staggered timings so the toner images are superimposed and transferred onto the same position on the intermediate transfer belt 21. The multicolor toner image moves to a secondary transfer position 29, which is a contact position between the secondary transfer roller 27 and the intermediate transfer belt 21, due to the circular travel of the intermediate transfer belt 21.

In synchronization with timing of the image forming operation, a sheet S is conveyed from a feeder unit (not illustrated) on a conveyance path 28 towards the secondary transfer position 29, where the sheet S is sandwiched between the secondary transfer roller 27 and the intermediate transfer belt 21 and electrostatic force between the secondary transfer roller 27 and the intermediate transfer belt 21 causes the multicolor toner image on the intermediate transfer belt 21 to be transferred onto the sheet S at one time.

The sheet S that has passed through the secondary transfer point 29 is conveyed to the fixing unit 30, and, when passing through a fixing nip 33 that is a point of contact between the fixing roller 31 and the pressure roller 32, the toner image is heated and pressurized to be fixed to the sheet S. Subsequently, an ejection roller (not illustrated), etc., ejects the sheet S outside the printer 1.

For each of the imaging units 10Y, 10M, 10C, 10K, residue, which includes toner on the photosensitive drum 11 that is not transferred to the intermediate transfer belt 21 and remains on the photosensitive drum 11, is cleaned off by a cleaning blade 151 of the cleaning unit 15.

Lubricant is applied by the lubricant supply unit 16 to the surface of the photosensitive drum 11 after the cleaning off of the residue. Applied lubricant is supplied to a point of contact between the cleaning blade 151 and the photosensitive drum 11 by rotation of the photosensitive drum 11 after passing by positions of the charging unit 12, the developer unit 14, etc.

Thus, friction is reduced between the cleaning blade 151 and the photosensitive drum 11, preventing early wear of the cleaning blade 151 and improving cleaning performance for a long period of time. Further, since a lubricant coating is interposed between the surface of the photosensitive drum 11 and toner particles of a toner image post-development, transferability is improved for a long period of time.

(2) Lubricant Supply Unit

FIG. 2 shows an enlargement of the lubricant supply unit 16 of the imaging unit 10K, and the photosensitive drum 11 and the cleaning unit 15 disposed in the vicinity. The imaging units are all configured in essentially the same way, and therefore only the lubricant supply unit 16 of the imaging unit 10K is described below and description is omitted of the lubricant supply units 16 of the other imaging units 10Y, 10M, 10C.

As shown in FIG. 2, the lubricant supply unit 16 is disposed downstream of the cleaning unit 15 in a drum rotation direction A.

The cleaning blade 151 of the cleaning unit 15 is polyurethane rubber processed into a plate shape, a leading edge of the cleaning blade 151 contacting the surface of the photosensitive drum 11 in a direction opposite (counter to) the drum rotation direction A, and scraping off residue, including residue toner, from the photosensitive drum 11. Scraped off residue is conveyed by a recovery screw 152 in a housing 150 to a waste toner recovery box (not illustrated) to be recovered.

The lubricant supply unit 16 includes a housing 50, a block of solid lubricant 51, a brush roller 52, a support member 53, pressing springs 54, 55 (pressing spring 55 is obscured by pressing spring 54 and not visible in this diagram), and a leveling blade 56.

The housing 50 contains the block of solid lubricant 51, the brush roller 52, the support member 53, and the pressing springs 54, 55.

The block of solid lubricant 51 is, for example, molten-molded product of metal soap powder, is made of a fatty acid metal salt, and in this case zinc stearate is used. Zinc stearate is characterized by high releasability (corresponding to a high pure water contact angle) and low friction coefficient, and is suitable as a lubricant because it has high transferability and cleaning performance. However, other materials may be used.

The brush roller 52 has a metallic core 521 provided with a large number of electrically conductive brush hairs 522, and rotates in a direction indicated by an arrow C in synchrony with rotation of the photosensitive drum 11. The brush roller 52 is interposed between the photosensitive drum 11 and the block of solid lubricant 51, and the brush hairs 522 scrape lubricant from the block of solid lubricant 51 and apply (supply) same to the surface of the photosensitive drum 11 at a position of contact with the surface of the photosensitive drum 11. A contact position of the brush hairs 522 of the brush roller 52 with the surface of the photosensitive drum 11 is an application position of lubricant onto the photosensitive drum 11.

The support member 53 is a metallic plate-shaped member integrally attached to a rear face 512 (second face) of the block of solid lubricant 51, which is opposite a surface 511 (first face) in contact with the brush roller 52.

The pressing springs 54, 55 apply a biasing force to the block of solid lubricant 51, pressing the block of solid lubricant 51 against the brush roller 52.

FIG. 3 is an exploded perspective view of the lubricant supply unit 16 from a direction indicated by an arrow D in FIG. 2, and shows only the block of solid lubricant 51, the brush roller 52, the support member 53, and the pressing springs 54, 55. In FIG. 3, a direction parallel to a rotation axis 529 of the metallic core 521 of the brush roller 52 is an X axis direction, a direction towards the brush roller 52 from the block of solid lubricant 51 is a Z axis direction, and a direction perpendicular to both the X axis and the Z axis is a Y axis direction. The X axis direction is direction parallel to the rotation direction of the photosensitive drum 11. Further, the Z axis corresponds to a dot-dash line 90 shown in FIG. 2.

As shown in FIG. 3, the block of solid lubricant 51, the brush roller 52, and the support member 53 are elongated in the X axis direction, and although not shown in FIG. 3 the housing 50 and the levelling blade 56 are also elongated in the X axis direction.

Each of the pressing springs 54, 55 is a torsion coil spring formed by winding a metallic wire such as a stainless steel wire or piano wire into a coil, and, in accordance with Hooke's law, has a restoring force that attempts to return the spring to an original shape that increases in proportion to the magnitude of the torsion angle. Hereinafter, referred to simply as "springs" 54, 55.

The springs 54, 55 are disposed at positions equidistant in the X axis direction from a position 532 at a center in the X axis direction of the block of solid lubricant 51, towards opposite ends of the block of solid lubricant 51 in the X axis direction.

The spring 54 includes a coil 540, an arm 541 extending from one end of the coil 540, and an arm 542 extending from the other end of the coil 540.

The coil 540 is fitted onto a shaft 57 for determining position of the coil 540 in the housing 50, and position of the spring 54 relative to the block of solid lubricant 51 is determined by this fitting onto the shaft 57.

The arm 541 is bent at a right angle partway along the direction of extension, and an end portion 543 from the bend to tip is engaged with the block of solid lubricant 51 via the support member 53. More specifically, the end portion 543 of the arm 541 is in contact with a surface 531 of the support member 53 opposite a surface that is in contact with the block of solid lubricant 51.

The arm 542 is also bent at a right angle partway along the direction of extension, and an end portion 544 from the bend to tip is retained by a support 50a (FIG. 2) of the housing 50.

Similarly, the spring 55 includes a coil 550, an arm 551 extending from one end of the coil 550, and an arm 552 extending from the other end of the coil 550.

The coil 550 is fitted onto a shaft 58 for determining position of the coil 550 in the housing 50, and position of the spring 55 relative to the block of solid lubricant 51 is determined by this fitting onto the shaft 58.

The arm 551 is bent at a right angle partway along the direction of extension, and an end portion 553 from the bend to tip is engaged with the block of solid lubricant 51 via the support member 53, as with the end portion 543 of the arm 541.

The arm 552 is also bent at a right angle partway along the direction of extension, and an end portion 554 from the bend to tip is retained by a support 50b (FIG. 4) of the housing 50.

Note that the coils 540, 550 of the springs 54, 55, when viewed in the Y direction, are wound in opposite directions, but coil material, thickness, length, number of windings, coil diameter, arm length, spring constant (N/°), etc., are the same, and the springs 54, 55 have the same properties as each other as torsion coil springs. It can be said that the springs 54, 55 are symmetrical with respect to a virtual plane passing through the position 532 and orthogonal to the X axis.

According to this configuration, the restoring force due to the torsion of the springs 54, 55 acts as a biasing force (force direction indicated by arrow G) on the block of solid lubricant 51 via the support member 53 from the arms 541, 551, and this biasing force presses the block of solid lubricant 51 against the brush roller 52.

The brush roller 52 rotates while the block of solid lubricant 51 is pressed against the brush roller 52, the brush hairs 522 of the brush roller 52 thereby scraping lubricant from the block of solid lubricant 51. Lubricant, more specifically lubricant particles, are conveyed to the application position of the photosensitive drum 11 by rotation of the brush roller 52, to be supplied to the photosensitive drum 11.

Scraping of the block of solid lubricant 51 by the brush roller 52 is performed from a time when the block of solid lubricant 51 is new whenever the brush roller 52 rotates due to image forming operations. Approaching the lifespan (end of life) of the printer 1, the photosensitive drum 11, or the cleaning blade 151, the block of solid lubricant 51 decreases, and thickness of the block of solid lubricant 51 becomes thinner (length shortens along the Z axis direction).

As the block of solid lubricant 51 decreases, if the pressing force due to the springs 54, 55 on the block of solid lubricant 51 towards the brush roller 52 were to decrease, the amount of lubricant supplied to the photosensitive drum 11 would decrease as the end of life is approached, leading to a risk of cleaning failure, as described under the "background of the invention".

Thus, according to the present embodiment, even though the block of solid lubricant 51 decreases from a new state, the pressing force due to the springs 54, 55 on the block of solid lubricant 51 towards the brush roller 52 is configured to not decrease, and therefore it is possible to prevent cleaning failure due to a decrease in supply of lubricant to the photosensitive drum 11 by using a simple spring configuration. Details of this are provided later.

Returning to FIG. 2, the levelling blade 56 is supported by the housing 50 at a position downstream of the brush roller 52 in the drum rotation direction A, levels lubricant supplied to the photosensitive drum 11 as the lubricant passes through a gap between the levelling blade 56 and the surface of the photosensitive drum 11, thereby forming a film of lubricant having uniform thickness on the photosensitive drum 11. This film of lubricant is supplied to the cleaning blade 151 by rotation of the photosensitive drum 11.

Use of the levelling blade 56 as a levelling member is described above, but as long as lubricant on the photosensitive drum 11 is levelled, the levelling member need not be a blade, and may be a roller, for example. Further, use of the cleaning blade 151 as a cleaning member is described above, but as long as the surface of the photosensitive drum 11 is cleaned, the cleaning member need not be a blade, and may be a roller, for example. Further, the cleaning blade 151 is disposed upstream of the brush roller 52 in the drum rotation direction A, but this is not required. For example, the cleaning blade 151 may also have the function of the levelling blade 56 and be disposed downstream of the brush roller 52 in the drum rotation direction A.

(3) Biasing Force on the Block of Solid Lubricant from the Spring

FIG. 4 shows two states in which the biasing force of spring 55 acts on the block of solid lubricant 51, one at a time when the block of solid lubricant 51 is new and the other approaching the end of the life of the block of solid lubricant 51. FIG. 4 is a view of the spring 55 from the Y axis direction shown in FIG. 3, but for ease of description "up" and "down" are reversed from FIG. 3.

As shown in FIG. 4, when the block of solid lubricant 51 is new, when the end portion 553 (engagement portion) of the arm 551 of the spring 55 corresponds to point of action of a biasing force F acting on the block of solid lubricant 51 via the support member 53 from the spring 55, the direction of the biasing force F is a second direction different from the Z axis direction (first direction) by an angle θ, which is greater than zero, and a component of the biasing force F in the Z axis direction (Z axis component) is a pressing force P on the block of solid lubricant 51 towards the brush roller 52.

According to the configuration shown in FIG. 4, the biasing force F on the block of solid lubricant 51 from the spring 55 is primarily composed of X axis and Z axis components and almost no force is generated in the Y axis direction.

A relationship between the pressing force P and the biasing force F is represented by P=F×cos θ, and the pressing force P when new is smaller than the biasing force F according to the size of the angle θ. Note that magnitude of the biasing force F decreases as the torsion angle of the spring 55 decreases (i.e., as the angle θ decreases).

Due to scraping of the block of solid lubricant 51, the block of solid lubricant 51 decreases and thickness of the block of solid lubricant 51 decreases (height in the Z axis direction decreases), following this, the spring 55 elastically deforms and the torsion angle decreases, and therefore the angle θ of the biasing force F relative to the Z axis direction also decreases.

In other words, as the block of solid lubricant 51 decreases, a ratio of the Z axis component of the biasing force F increases. At end of life, direction of the biasing force F matches the Z axis direction (angle θ=0), and the biasing force F=the pressing force P.

According to this configuration, in order to increase the magnitude of the pressing force P from new, it suffices that the following condition is satisfied.

The spring 55 has a property that as the torsion angle decreases (angle θ decreases), the biasing force F decreases. Thus, the biasing force F decreases as the torsion angle of the spring 55 decreases, due to decrease of the block of solid lubricant 51, and the pressing force P also decreases commensurately. However, as long as increase in the pressing force P due to the increase in ratio of the Z axis component of the biasing force F is greater than the decrease in the pressing force P, the magnitude of the pressing force P increases as the torsion angle decreases.

An expression satisfying this condition is described below with reference to FIG. 5.

FIG. 5 is a schematic diagram showing a relationship between a torsion angle φ and an angle θ of the spring 55.

The angle φ (°) shown in FIG. 5 indicates a torsion angle of the spring 55 from torsion angle=0° (corresponding to a natural state when no external force is applied and no elastic deformation occurs).

The angle $\phi_0$ (°) indicates a torsion angle when the direction of the biasing force F on the block of solid lubricant 51 from the spring 55 matches the Z axis direction.

The angle θ (°) indicates a torsion angle from the angle $\phi_0$ when the angle $\phi_0$ is taken as a reference.

The angle $\theta_1$ (°) indicates a torsion angle from the angle $\phi_0$ when the block of solid lubricant 51 is new.

The biasing force F (N) indicates the biasing force of the spring 55 at the angle θ.

Here, when the spring constant of the spring 55 is k (N/°), the torsion angle φ (°) when the block of solid lubricant 51 is new is $\phi_1$ (i.e. $\phi_0+\theta_1$), and the biasing force F (N) at the angle $\theta_1$ (°) is $F_1$, the following Expression 1 satisfies the above condition.

$$k \times \theta_1 < F_1 \times (1 - \cos \theta_1) \qquad \text{(Expression 1)}$$

Expression 1 is derived as follows.

When pressing force of the spring 55 when the block of solid lubricant 51 is new is $P_1$, and pressing force of the spring 55 when the block of solid lubricant 51 is at the end of its life is $P_2$, the pressing force $P_1$ is represented by $F_1 \times \cos \theta_1$ and the pressing force $P_2$ is represented by $k \times \phi_0$.

As long as $P_1 < P_2$, the pressing force P is greater when the block of solid lubricant 51 is at the end of its life than when the block of solid lubricant 51 is new. This is shown by the following Expression 2.

$$(F_1 \times \cos \theta_1) < (k \times \phi_0) \qquad \text{(Expression 2)}$$

As above, $\phi_0 = (\phi_1 - \theta_1)$, and Expression 3 is derived by substituting this into Expression 2.

$$(F_1 \times \cos \theta_1) < (k \times \phi_1 - k \times \theta_1) \qquad \text{(Expression 3)}$$

As above, $k \times \phi_1 = F_1$, and therefore substituting into Expression 3 results in Expression 1.

The above describes the spring 55, but the same applies to the spring 54. For each of the springs 54, 55 the X axis component Fx of the biasing force F acts on the support member 53, but as shown in FIG. 3, winding directions of the coils are reversed, and therefore the X axis components Fx of the springs 54, 55 work in opposite directions. Further, as above, the springs 54, 55 are torsion coil springs that have the same properties as each other, and therefore the magnitudes of their corresponding components Fx are substantially the same. Thus, the X axis component Fx of the spring 54 cancels out the X axis component Fx of the spring 55.

FIG. 6 is a graph showing a relationship between a torsion angle $\phi$, a biasing force F, and a pressing force P of the spring 55, and an example of a setting range of torsion angle when the block of solid lubricant 51 is new, according to the above configuration (embodiment).

As shown in FIG. 6, the biasing force F (N), according to Hooke's law, increases as the torsion angle $\phi$ increases. When the torsion angle $\phi$ is 180°, the angle $\theta$ is 0°, and the biasing force F is $F_0$.

The pressing force P is represented by $F \times \cos \theta$ on the graph. When the angle $\theta$ is 0°, the pressing force P is equal to the biasing force $F_0$, and as the angle $\theta$ increases from 0°, the pressing force P increases from $F_0$, peaks when the angle $\theta$ is about 15° (torsion angle $\phi$ is 195°) at maximum value Pm, and subsequently decreases as the angle $\theta$ increases.

The reason why the maximum value Pm is reached at a value of the angle $\theta$ other than 0° is that, as the angle $\theta$ increases, the biasing force F increases while the magnitude of $\cos \theta$ decreases, but the rate of decrease of the magnitude of $\cos \theta$ as the angle $\theta$ increases becomes greater than the rate of increase of the biasing force F.

As the angle $\theta$ increases, in the vicinity of 60° (torsion angle $\phi = 240°$), the pressing force P becomes equal to a pressing force $P_0$, which a minimum required force, and if the angle $\theta$ increases further, the pressing force P drops below the pressing force $P_0$. The pressing force $P_0$ is a minimum pressing force required to supply an amount of lubricant to the photosensitive drum 11 in order to maintain cleaning performance over the entire period of time from the time when the block of solid lubricant 51 is new until the end of its life, and is obtained in advance by experimentation and the like.

From the graph of the pressing force P ($F \times \cos \theta$), a range E of the angle $\theta$ in which the pressing force P is greater than $P_0$ and less than $F_0$, is, for example, 35° to 60° (torsion angle $\phi$ 215° to 240°). As long as an angle $\theta_1$ (torsion angle $\phi_1$) in the range E is set when the block of solid lubricant 51 is new, a greater value of the pressing force P from the spring 55 can act on the block of solid lubricant 51 during a period from when the block of solid lubricant 51 is new until the block of solid lubricant 51 reaches the end of its life ($\theta = 0°$, $\phi = 180°$) than when the block of solid lubricant 51 is new. That is, due to scraping of the block of solid lubricant 51, as the angle $\theta$ (torsion angle $\phi$) decreases, the pressing force P ($F \times \cos \theta$) increases, as indicated by the reference sign J.

FIG. 7A and FIG. 7B show configurations of comparative examples. FIG. 7A shows a compression coil spring 91 interposed between the block of solid lubricant 51 and the housing 50. FIG. 7B shows a torsion coil spring 92 interposed between the block of solid lubricant 51 and the housing 50.

According to a comparative example 1 shown in FIG. 7A, direction of a biasing force of the compression coil spring 91 to the block of solid lubricant 51 remains the same as the Z-axis direction from the block of solid lubricant 51 to the brush roller 52 from the time the block of solid lubricant 51 is new until the end of its life. As thickness of the block of solid lubricant 51 decreases due to scraping, the biasing force decreases, and therefore pressing force decreases as the end of the life of the block of solid lubricant 51 is approached.

According to a comparative example 2 shown in FIG. 7B, as thickness of the block of solid lubricant 51 decreases due to scraping, direction of a biasing force on the block of solid lubricant 51 from the torsion coil spring 92 changes, but as the torsion angle $\phi$ decreases, an angle with respect to the Z axis direction (corresponding to the angle $\theta$) increases. In other words, the opposite result occurs to the embodiment above, in which the angle $\theta$ decreases as the torsion angle $\phi$ decreases.

Thus, according to the comparative example 2, pressing force decreases as the end of life of the block of solid lubricant 51 is approached. The amount of lubricant scraped per rotation of the brush roller 52 decreases commensurately with the decrease in pressing force, and therefore an amount of lubricant supplied to the photosensitive drum 11 decreases.

Thus, according to the configurations of comparative examples 1 and 2, there is a risk of cleaning performance deteriorating as the end of life of the block of solid lubricant 51 is approached, due to the decrease in amount of lubricant supplied to the photosensitive drum 11 from the time when the block of solid lubricant 51 is new.

In contrast, according to the configuration of the embodiment above, pressing force improves from when the block of solid lubricant 51 is new, and even when the end of life of the block of solid lubricant 51 is approached, a minimum requirement of lubricant can be supplied to the photosensitive drum 11 and therefore cleaning performance can be maintained over a long period of time.

(4) Other Embodiments

According to the embodiment above, a torsion coil spring is used as a spring for pushing the block of solid lubricant 51 towards the brush roller 52, but this is just an example. As another example, a leaf spring can be used. In the following description, the embodiment above that uses a torsion coil spring is referred to as Embodiment 1, and an embodiment that uses a leaf spring is referred to as Embodiment 2.

FIG. 8A and FIG. 8B are diagrams for describing configuration of Embodiment 2. FIG. 8A shows a perspective view of a leaf spring, and FIG. 8B shows the leaf spring of FIG. 8A from the X axis direction.

As shown in FIG. 8A and FIG. 8B, a leaf spring 64 has an elongated shape, is made from a metal such as spring steel or stainless steel, a base end 641 at one end in a longitudinal direction of the leaf spring 64 is held by a support unit 65, an end portion 642 at the other end is free, forming what may be referred to as a cantilever. The support unit 65 is fixed to the housing 50.

In FIG. 8A and FIG. 8B, only one of the leaf spring 64 is shown, but for Embodiment 2, similarly to Embodiment 1, an additional leaf spring (not illustrated) is disposed in the X axis direction with a gap between it and the leaf spring 64.

The additional leaf spring has the same size, material, spring constant, etc., (same properties) as the leaf spring 64. The two leaf springs are disposed symmetrically, on a virtual plane perpendicular to the X axis that passes through the position 532, similarly to the springs 54, 55 of Embodiment 1. Thus, components Fx in the X axis direction of the two leaf springs act in opposing directions and cancel each other out. Where there is no particular need to distinguish between the two leaf springs, they are referred to individually as the leaf spring 64.

The end portion 642 of the leaf spring 64 is provided with an extension 643 that extends towards the fixed lubricant 51, engages with the block of solid lubricant 51 via the support member 53, and applies a biasing force in the direction indicated by the arrow U from the leaf spring 64 to the block of solid lubricant 51. The extension 643 is a point of application of the biasing force to the block of solid lubricant 51 from the leaf spring 64.

Magnitude of the biasing force (restoring force of the leaf spring) increases as a deflection amount increases from a natural state (indicated by broken line outline) 644 of the leaf spring 64, where a natural state is when no external force acts on the leaf spring 64. According to the configuration shown in FIG. 8A and FIG. 8B, direction of the biasing force to the block of solid lubricant 51 from the leaf spring 64 is similar to that of Embodiment 1.

The configuration of Embodiment 2 that used the leaf spring 64 is similar to the configuration of Embodiment 1 that uses a torsion coil spring, as shown in FIG. 4, in that a position of the leaf spring 64 relative to the block of solid lubricant 51 is determined so that the biasing force F on the block of solid lubricant 51 from the leaf spring 64 acts in a direction that is an angle θ from the Z axis direction, the angle θ decreasing as scraping decreases the block of solid lubricant 51 so a component P (pressing force) increases in the Z axis direction. This has the same effect as in Embodiment 1, i.e. that cleaning performance is maintained over a long period of time over the life of the block of solid lubricant 51.

When the leaf spring 64 is used, the same relationship as for the torsion coil spring shown in FIG. 6 is created between the biasing force F, the pressing force P (F cos θ), and the angle θ, and therefore positions of the leaf spring 64 and the block of solid lubricant 51 relative to each other are such that, when the block of solid lubricant 51 is new, the angle θ is in the range E from the minimum required pressing force $P_0$, and during the life of the block of solid lubricant 51 the pressing force P is greater than when the block of solid lubricant 51 is new.

According to the configuration shown in FIG. 8A and FIG. 8B, when viewed from the Z axis direction, the base end 641 and the end portion 642 of the leaf spring 64 are disposed lined up along the longitudinal direction (X axis direction) of the block of solid lubricant 51. Thus, as shown in FIG. 8B, the leaf spring 64 can be disposed directly to a side of the block of solid lubricant 51 in the Y axis direction, and when the leaf spring 64 is disposed in the housing 50, occupied space in the Y axis direction can be reduced.

(5) Evaluation Experiment Results for Spring Pressing Force Change and Cleaning Performance For the embodiment examples and the comparative examples, a photosensitive drum unit of a bizhub PRESS C1100 of Konica Minolta Co., Ltd. manufacture was modified as an experimental machine, a lubricant supply device was installed to press a block of solid lubricant against a brush roller by means of a spring, and experimental evaluation was performed with respect to pressing force changes of the spring and cleaning performance of the photosensitive drum. FIG. 9 shows these evaluation experiment results.

In FIG. 9, a horizontal axis indicates a cumulative print count from when the block of solid lubricant is new, and a vertical axis indicates pressing force P (N). The cumulative print count is a count of A4 size sheets continuously printed during the experiment. The target life corresponds to the end of life of the block of solid lubricant, and is here indicated at 600,000 sheets.

Graphs of embodiment examples A to C and comparative examples A and B indicate pressing force changes thereof.

Here, embodiment example A corresponds to Embodiment 1, i.e., a time when the angle θ shown in FIG. 6 is 0° corresponds to the target life.

Embodiment example B is essentially configured the same as Embodiment 1, but a time when the pressing force shown in FIG. 6 becomes the maximum value Pm (the angle θ is approximately 15°) corresponds to the target life.

The embodiment example C corresponds to the Embodiment 2.

The comparative example A corresponds to the comparative example 1 shown in FIG. 7A, and the comparative example B corresponds to the comparative example 2 shown in FIG. 7B.

The circle, triangle, and cross symbols on the graphs of the embodiment examples A to C and the comparative examples A and B indicate quality of cleaning performance.

A circle indicates that cleaning failure has not yet occurred. A triangle indicates that a streak-like stain due to cleaning failure has not occurred in an image formed on a sheet, but a cleaning failure on the photosensitive drum has occurred. A cross indicates that a streak-like stain due to cleaning failure has occurred on an image formed on a sheet. Judging whether or not cleaning failure occurred was performed based on an unaided visual inspection. For each graph, a cumulative sheet count from zero to a triangle symbol is evaluated as a circle symbol, from a triangle symbol to a cross symbol as a triangle symbol, and from a cross symbol as a cross symbol. Embodiment example B was evaluated as a circle symbol for the entire period.

As physical properties that exist between pressing force and cleaning performance, there are changes in coefficient of friction of the cleaning blade and lubricant thickness on the photosensitive drum, but it has been found the changes in coefficient of friction and lubricant thickness correlate with pressing force and lubricant supply amount, and since it is possible to obtain a result of cleaning performance without evaluating coefficient of friction and lubricant thickness, they were omitted from evaluation.

From the trends of the graphs of the embodiment examples A to C shown in FIG. 9, it can be seen that in each case the pressing force increases from the minimum required pressing force $P_0$ when the block of solid lubricant is new, gradually increases as the cumulative print count increases, and is maintained in a range not less than the minimum required pressing force $P_0$ at least until reaching the target life.

According to this trend of pressing force, lubricant supply to the photosensitive drum is stabilized, and for each of the embodiment examples A to C, cleaning performance is not rated by a triangle symbol or cross symbol at least until reaching the target life, meaning that cleaning performance is judged to be good.

In particular, for the embodiment example B, the pressing force is the maximum value Pm at the point of the target life. For the embodiment example B, the pressing force when new is less than that of the embodiment example A, but the magnitude is not less than the pressing force $P_0$, and a sufficient pressing force P is ensured even after exceeding the target life, and therefore life of the product can be extended further than for embodiment example A.

On the other, looking at the graphs of comparative examples A and B, pressing force is greater than any of the embodiment examples A to C when the block of solid lubricant is new, but as cumulative print count increases pressing force decreases, and when reaching target life, pressing force drops below the pressing force $P_0$.

As described above, the smaller the pressing force, the lower the supply amount of lubricant to the photosensitive drum and the lower the cleaning performance. For both of the comparative examples A and B, the cleaning performance is marked by a triangle symbol and a cross symbol partway to the target life, indicating that good cleaning performance cannot be ensured until the target life, resulting in image quality deterioration due to cleaning failure.

As shown in FIG. 9, adopting the spring configuration of embodiment examples A to C ensures cleaning performance over a long period of time from when the block of solid lubricant is new until the target life (end of life), demonstrating that good image quality can be maintained.

(6) Spring Modifications (6-1) According to Embodiment 1, as shown in FIG. 3, a direction of the axes 549, 559 (coil axes) of the coils 540, 550 of the torsion coil springs 54, 55 is parallel to the Y axis direction, which is perpendicular to the longitudinal direction of the block of solid lubricant 51 (i.e., the X axis direction). However, the present invention is not limited to this description.

For example, a modification of arrangement of the torsion coil springs 54, 55 may be adopted in which the coil axes 549, 559 of the torsion coil springs 54, 55 are disposed along the longitudinal direction of the block of solid lubricant 51 (i.e., the X axis direction).

FIG. 10A is an exploded perspective view showing this modification. FIG. 10B shows this modification viewed from the X axis direction.

As shown in FIG. 10A and FIG. 10B, one arm 751 of a torsion coil spring 75 is held by the housing 50, and an end portion 753 of another arm 752 engages with the block of solid lubricant 51 via the support member 53.

A coil 750 of the torsion coil spring 75 is fitted onto a shaft 76 provided to the housing 50 for determining position, so that a coil axis 759 is along the longitudinal direction of the block of solid lubricant 51 (i.e., the X axis direction), which determines the position of the torsion coil spring 75 relative to the block of solid lubricant 51.

According to the configuration shown in FIG. 10A and FIG. 10B, a biasing force on the block of solid lubricant 51 from the torsion coil spring 75 is primarily composed of Y axis and Z axis components and almost no force is generated in the X axis direction. A component Fy in the Y axis direction is applied to the block of solid lubricant 51, and therefore it is preferable that the block of solid lubricant 51 is regulated by a regulating member (not illustrated) or the like so the block of solid lubricant 51 does not move freely in the Y axis direction.

Thus, the torsion coil spring may be disposed according to Embodiment 1 as shown in FIG. 3, and may be disposed according to the modification shown in FIG. 10A and FIG. 10B, increasing a degree of design freedom when positioning the torsion coil spring. Disposition of a torsion coil spring is not limited to the examples above. As another example, a torsion coil spring may be disposed so the coil axis 759 is angled away from the X, Y, and Z axes.

According to the modification shown in FIG. 10A and FIG. 10B, the end portion 753 of the torsion coil spring 75 is horizontal (parallel to the Y axis direction) when the block of solid lubricant 51 is new, but as thickness of the block of solid lubricant 51 decreases due to scraping, the torsion angle of the torsion coil spring 75 decreases, and therefore the end portion 753 of the torsion coil spring 75 rotates from the horizontal as the torsion angle becomes smaller, transitioning to a tilted orientation. Unless the end portion 753 of the torsion coil spring 75 is bent, length of the end portion 753 that is in contact with the support member 53 becomes shorter than when the end portion 753 is horizontal, as the amount of rotational movement increases.

Restoring force of the torsion coil spring 75 is transmitted to the support member 53 via contact therewith, and therefore as the contact portion with the support member 53 is reduced, pressing force from the torsion coil spring 75 tends to concentrate on the reduced contact portion.

For example, in a case where position in the Y axis direction of a portion where pressing force is concentrated shifts from a Y axis direction center towards an edge portion, a corresponding portion of the surface 511 of the block of solid lubricant 51 facing the brush roller 52 is subjected to increased contact pressure with the brush roller 52, increasing a scraping amount, and other portions of the surface 511 of the block of solid lubricant 51 are subjected to decreased contact pressure with the brush roller 52, decreasing a scraping amount, and therefore there is a risk of uneven scraping occurring.

In a device configuration in which uneven scraping may occur, it is preferable to decide shape, material, mechanism, etc., of the torsion coil spring 75 so that, over the period of life of the block of solid lubricant 51, contact length between the end portion 753 of the torsion coil spring 75 and the support member 53 is at least sufficient to ensure that uneven scraping does not occur. The same applies for the following modification.

(6-2) The leaf spring 64 of Embodiment 2 can also be modified to an orientation relative to the block of solid lubricant 51 shown in FIG. 11A and FIG. 11B.

FIG. 11A is an exploded perspective view showing this modification of a leaf spring. FIG. 11B shows this modification from the X axis direction.

As shown in FIG. 11A and FIG. 11B, a base end 851 of the leaf spring 85 is held by a support unit 86 of the housing 50, and an end portion 852 is engaged with the block of solid lubricant 51 via the support member 53. According to this modification, the base end 851 and the end portion 852 of the leaf spring 85, when viewed from the Z axis direction, are disposed lined up along a direction (the Y axis direction) perpendicular to both the Z axis direction and the longitudinal direction of the block of solid lubricant 51, and the end portion 852 applies a biasing force to the block of solid lubricant 51 as if scooping up the block of solid lubricant 51 from below.

As in the modification shown in FIG. 10A and FIG. 10B, a biasing force on the block of solid lubricant 51 from the leaf spring 85 is primarily composed of Y axis and Z axis components and almost no force is generated in the X axis direction.

Thus, the leaf spring may be disposed according to Embodiment 2 as shown in FIG. 8A and FIG. 8B, and may be disposed according to the modification shown in FIG. 11A and FIG. 11B, increasing a degree of design freedom when positioning the leaf spring. Position of a leaf spring is not limited to the examples described above. As another example, when viewed in the Z axis direction, the leaf spring may be disposed so the base end 851 and the end portion 852 line up in a direction angled away from the X, Y, and Z axes.

(6-3) Further, as shown in FIG. 12, a configuration may be adopted that uses a member (biasing force adjustment member) 555 provided at the end portion 553 of the arm 551 of the torsion coil spring 55 that has the same shape as the torsion coil spring of Embodiment 1.

The biasing force adjustment member 555 shown in FIG. 12 is a rod-shaped member that is long along the Y axis direction, fixed to the arm 551 to be integrated with the arm 551. A portion of the biasing force adjustment member 555 facing the support member 53 has a semielliptical surface shape when viewed from the Y axis direction.

When the block of solid lubricant 51 is new, a portion 556 of the semielliptical surface of the biasing force adjustment member 555 is in contact with the support member 53. As the block of solid lubricant 51 decreases from scraping, a point of contact with the support member 53 is displaced towards a vertex 557, and at the end of life of the block of solid lubricant 51, the vertex 557 comes into contact with the support member 53. That is, a portion of the semielliptical surface of the biasing force adjustment member 555 contacts the block of solid lubricant 51 via the support member 53, and as the block of solid lubricant 51 decreases, the arm 551 follows, moving towards its original orientation due to a restoring force, causing a contact portion to change.

When a distance between the contact portion 556 of the biasing force adjustment member 555 and the arm 551 when the block of solid lubricant 51 is new is $\alpha 1$ and distance between the contact portion 557 of the biasing force adjustment member 555 and the arm 551 at the end of life of the block of solid lubricant 51 is $\alpha 2$, the relation $\alpha 1 < \alpha 2$ is satisfied by the semielliptical shape of the biasing force adjustment member 555. A distance $\alpha$ can be regarded as a distance between the block of solid lubricant 51 and the arm 551.

The presence of the distance $\alpha 1$ (which is greater than zero) when the block of solid lubricant 51 is new means that the torsion angle $\phi$ of the spring 55 is greater than when the distance $\alpha$ is zero (corresponding to Embodiment 1), which also increases the biasing force F accordingly.

This also applies at the end of life of the block of solid lubricant 51, except that distance $\alpha 2$ is greater than the distance $\alpha 1$. Compared with a case in which the distance $\alpha 2$ equals $\alpha 1$, the difference between the distance $\alpha 2$ and the distance $\alpha 1$ causes a correspondingly greater biasing force F.

When comparing two configurations, a configuration in which the distance $\alpha$ increases as the block of solid lubricant 51 is scraped away (FIG. 12) and a configuration in which the distance $\alpha$ is constant, and considering a case in which the block of solid lubricant 51 is decreased by the same amount over a constant period, the torsion angle $\phi$ for the configuration using a constant distance $\alpha$ becomes smaller by $\beta 1$ over the constant period, and the torsion angle $\phi$ for the configuration in which the distance $\alpha$ increases becomes smaller by $\beta 2$, which is less than $\beta 1$ in correspondence to the increase in the distance $\alpha$.

During the constant period, the smaller the decrease $\beta$ of the torsion angle $\phi$, the smaller a decrease of the biasing force F, and therefore the configuration in which the distance $\alpha$ becomes larger (FIG. 12) can suppress a decrease in the biasing force F over the constant period, for example the life of the block of solid lubricant 51, more than the configuration in which the distance $\alpha$ is constant.

For example, if size and shape of the member 555 are designed to make the torsion angle $\phi$ of the spring 55 at the end of life shown in FIG. 12 equal to the torsion angle $\phi$ corresponding to the maximum value Pm of the graph of the pressing force P (F cos θ) shown in FIG. 6, the pressing force P can be made to increase throughout the period from when the block of solid lubricant 51 is new until the end of its life.

According to the configuration above, shape of the biasing force adjustment member 555 can be formed so the decrease $\beta$ of the torsion angle $\phi$ of the arm 551 per unit of decrease in thickness of the block of solid lubricant 51 due to scraping is less at the end of the constant period than at the start of the constant period.

As shown in FIG. 12, the biasing force adjustment member 555 has a semielliptical shape, but other shapes are possible. For example, as shown in FIG. 13, a configuration can be adopted in which a shape when viewed from the Y axis direction is rectangular, and a bar-shaped member 558 elongated in the Y axis direction is fixed to the end portion 553 of the arm 551 as a biasing force adjustment member.

A biasing force adjustment member is not limited to torsion coil springs, and may be provided to the extension 643 of the end portion 642 of the leaf spring 64 or the end portion 852 of the leaf spring 85, for example.

(6-4) According to Embodiment 1, two springs 54, 55 are disposed spaced along the X axis direction, but other configurations are possible. Two or more springs may be used.

Further, as shown in FIG. 14, a single spring 54 can be disposed relative to the block of solid lubricant 51.

When this disposition is adopted, both ends of the support member 53 supporting the block of solid lubricant 51 are extended in the X axis direction, a positioning pin 111 provided to the housing 50 is fitted to a through hole 582 provided to one end 581 of the support member 53, and a positioning pin 112 provided to the housing 50 is fitted to a through hole 584 provided to another end 583 of the support member 53. According to this fitting of the positioning pins 111, 112 to the through holes 582, 584 of the support member 53, movement of the support member 53 is allowed in the Z axis direction and limited in the X axis direction and the Y axis direction.

Thus, even a simple configuration using one spring 54 can support the block of solid lubricant 51 without tilting in the X axis direction towards one side or the other in the X axis direction of the block of solid lubricant 51. In order to balance the pressing force P of the block of solid lubricant 51 on the brush roller 52 along the X axis direction, the spring 54 is preferably disposed so the end portion 553 of the spring 54 engages with a substantially central position in the X axis direction of the block of solid lubricant 51, via the support member 53.

(6-5) Further, according to Embodiment 1, the arms 541, 551 of the springs 54, 55 are described as simply being in contact with the support member 53, but this is just an example, and another example is a configuration in which arms of springs are connected to the support member 53.

FIG. 15A shows an example configuration in which two springs 55 are connected to the support member 53, and FIG. 15B shows an enlargement of a connected portion H shown in FIG. 15A.

As shows in FIG. 15A the two springs 55 have the same shape, dimensions, spring constant, etc., as each other, the same torsion coil spring properties, and are disposed in the same orientation relative to the block of solid lubricant 51, as viewed from the Y axis direction (winding direction of coils is the same).

For each of the springs 55, an end portion 553 of the arm 551 (portion elongated in the Y axis direction as shown in FIG. 3) is connected to the support member 53. More specifically, as shown in the enlargement of FIG. 15B, the end portion 553 of the arm 551 of the spring 55 is connected to the support member 53 by a connecting member 536 to be freely rotatable in a direction indicated by the arrow I while integrally moving together with the support member 53 in the X axis direction.

According to this connection, for each of the springs 55, when the block of solid lubricant 51 decreases, the torsion angle $\phi$ of the spring 55 decreases and the arm 551 moves in a direction indicated by the arrow Q, and therefore a component Fx in the X axis direction of the biasing force F of the spring 55 acts on the support member 53 via the connecting member 536 and the support member 53 moves in the X axis direction by a distance corresponding to an X axis direction component of the distance the end portion 553 of the arm 551 moves in the direction indicated by the arrow Q.

That is, as shown in FIG. 15A, over the life of the block of solid lubricant 51, as the block of solid lubricant 51 decreases, the torsion angle $\phi$ of the spring 55 decreases, and the support member 53 moves in the X axis direction. Taking the block of solid lubricant 51 when new as a reference, the support member 53 is shown having moved by a distance $\gamma$ in the X axis direction at the end of life of the block of solid lubricant 51.

The block of solid lubricant 51 is integrated with the support member 53, and the brush roller 52 is held by support units 501 of the housing 50 to prevent free movement in the X axis direction, and therefore when the support member 53 moves in the X axis direction, the block of solid lubricant 51 also moves by the same amount relative to the brush roller 52 in the X axis direction.

The block of solid lubricant 51 moving in this way relative to the brush roller 52 in the X axis direction serves to prevent, as much as possible, uneven wear of the surface 511 of the block of solid lubricant 51 in the X axis direction by scraping of the brush roller 52.

That is, scraping of the block of solid lubricant 51 by the brush roller 52 is performed by brush hairs 522 of the brush roller 52, and when the brush hairs 522 continue to wear away at a location of the surface 511 of the block of solid lubricant 51, grooves easily form.

When a groove forms in the surface 511 of the block of solid lubricant 51, a number of the brush hairs 522 may enter and concentrate in the groove, causing further wear in the groove, making the groove deeper. If such an effect progresses until the end of life of the block of solid lubricant 51, the surface 511 of the block of solid lubricant 51 easily becomes unevenly scraped as by comb teeth.

In such a case, differences occur in amounts of lubricant scraped by the brush roller 52 along the X axis direction, causing differences in lubricant supply to the photosensitive drum 11 from the brush roller 52 along the X axis direction. This leads to unevenness in lubricant supply amounts to the photosensitive drum 11.

When unevenness in lubricant supply amounts to the photosensitive drum 11 occurs, unevenness in lubricant supply amounts to the cleaning blade 151 also occurs, which can easily cause a decrease in cleaning performance at a portion of the cleaning blade 151 where a lubricant supply amount is small.

Further, uneven lubricant supply to the photosensitive drum 11 causes differences in transferability at locations along the X axis direction on the photosensitive drum 11 (corresponding to a primary scanning direction), which makes occurrence of transfer unevenness more likely in images on a sheet S after secondary transfer.

Uneven wear of the block of solid lubricant 51 is caused in a case in which the brush hairs 522 continue to scrape the same location of the surface 511 of the block of solid lubricant 51.

Accordingly, as in the modification shown in FIG. 15A and FIG. 15B, when a configuration is adopted in which the block of solid lubricant 51 moves in the X axis direction relative to the brush roller 52 as the torsion angle $\phi$ of the springs 55 decreases as the block of solid lubricant 51 decreases due to scraping, a situation in which the brush hairs 522 continue to scrape the same locations of the surface 511 of the block of solid lubricant 51 until the end of life of the block of solid lubricant 51 is avoided, making it unlikely that uneven scraping of the block of solid lubricant 51 occurs, and making it possible to prevent decreases in cleaning performance and transferability.

As shown in FIG. 15A, the two springs 55 are the same, and disposed in the same orientation, and therefore the component Fx in the X axis direction of the biasing force F of each of the springs 55 acts in the same direction, and do not cancel each other out as in Embodiment 1.

In FIG. 15A and FIG. 15B, a torsion coil spring configuration is described, but the same applies to a configuration using a leaf spring. More specifically, a configuration can be adopted in which the extension 643 provided to the end portion 642 of the leaf spring 64, as shown in FIG. 8A and FIG. 8B, is connected to the support member 53 by using the connecting member 536 as described above.

When this configuration is adopted, for each of the two leaf springs 64, in order that the component Fx in the X axis direction of the biasing force F act in the same direction, it is possible to orient the leaf springs 64 in the same direction, for example, arranging the leaf springs 64 so the end portion 642 is positioned downstream (or upstream) in the X axis direction of the base end 641 for both of the leaf springs 64.

Depending on material, rigidity, number (density) per unit area, etc., of brush hairs of the brush roller 52, it may be very unlikely that uneven wear of the block of solid lubricant 51 occurs. In such cases, a configuration that causes movement of the block of solid lubricant 51 in the X axis direction is not necessary, and a configuration in which an arm of a spring only contacts the support member 53 can be used, such as Embodiment 1. Accordingly, depending on the brush roller used, Embodiment 1 or the present modification can be adopted.

(7) Other Modifications

The embodiments above describe torsion coil springs and leaf springs, but other shapes are possible, for example a linear elastic member can be used as a spring. Further, spring material is not limited to those described above, and other materials may be used.

Further, configurations are described that use the brush roller 52 as a lubricant supply member that supplies lubricant scraped from the block of solid lubricant 51 to the photosensitive drum 11, but a lubricant supply member is not limited to a brush configuration. For example, a roller provided with an elastic layer such as a sponge or foam around the rotating shaft 521 may be used.

Further, the support member 53 supporting the block of solid lubricant 51 is described as metallic, but other materials such as resin may be used. Further, the support member 53 need not be plate-shaped, and may be other shapes. For example, a metal plate having a U shape can be used as the support member 53. Further, a configuration can be adopted in which the block of solid lubricant 51 is attached to the support member 53 by double-sided tape, for example, but the block of solid lubricant 51 can be attached by other methods. For example, integral molding or the like may be used. Further, adhesion need not be used, and, depending on device configuration, it may be possible to adopt a configuration in which the block of solid lubricant 51 is simply placed on the support member 53. Further, instead of regarding the block of solid lubricant 51 and the support member 53 as separate members, the block of solid lubricant 51 and the support member 53 can together be regarded as one block of solid lubricant.

(7-2) According the embodiments described above, the spring 55 is disposed so the block of solid lubricant 51 and the coil 550 of the spring 55 overlap when the block of solid lubricant 51 is new and viewed from the Y axis direction, but other configurations are possible.

It suffices that the positions of the block of solid lubricant 51 and the spring relative to each other are determined so that the biasing force F of the spring acts on the block of solid lubricant 51 in a second direction at the angle θ from the Z axis direction (first direction), which is towards the brush roller 52 from the block of solid lubricant 51, and the component Fz of the Z axis direction of the biasing force F presses the block of solid lubricant 51 in the Z axis direction to the brush roller 52, and, as the block of solid lubricant 51 decreases due to scraping, the angle θ from the Z axis direction decreases and the component Fz of the Z axis direction of the biasing force F increases.

More specifically, for example, when the block of solid lubricant 51 is new as shown in FIG. 4, positions of the spring 55 relative to the block of solid lubricant 51 can be determined so a connecting portion 551a (start of the arm 551) between the coil 550 and the arm 551 of the spring 55 is positioned further downstream in the Z axis direction (towards the brush roller 52) than the end portion 553 of the arm 551 (corresponding to a point of action of the biasing force F on the block of solid lubricant 51).

That is, as long as a positional relationship is satisfied in which, when the block of solid lubricant 51 is new, the connecting portion 551a is further downstream in the Z axis direction (towards the brush roller 52) than the end portion 553 (point of action) of the arm 551, then a configuration is realized in which, as the block of solid lubricant 51 decreases, the angle θ from the Z axis direction of the biasing force F decreases, and the component in the Z axis direction of the biasing force F on the block of solid lubricant 51 (i.e., pressing force P) increases. This also applies to the spring 75 shown in FIG. 10A and FIG. 10B.

Further, the leaf spring 64 shown in FIG. 8A and FIG. 8B can similarly be configured so the base end (fixed end) 641 is further downstream in the Z axis direction than the extension 643 (point of action) provided to the end portion 642.

In other words, for a torsion coil spring and for a leaf spring, when the biasing force F applied to the block of solid lubricant 51 is considered to have a moment of force centered on a predefined position, when the block of solid lubricant 51 is new, a configuration can be adopted in which a positional relationship is satisfied in which the center of the moment (corresponding to the connecting portion 551a of an arm or the base end 641 of a leaf spring) is further downstream in the Z axis direction than the point of action (corresponding to the end portion 553 or the extension 643) of the biasing force F.

(7-3) According to the embodiments above, the lubricant supply device pertaining to the present invention is described as being applied to a tandem color printer, but this is just an example. The lubricant supply device can generally be applied to image forming devices such as copy machines, fax machines, or multifunction peripherals (MFP) that have an image carrier such as a photoreceptor that forms an image such as a toner image, for example.

Image carriers are not limited to the drum shape described above, and may be a belt shape, for example. Further, although not specifically mentioned above, in an intermediate transfer system, supplying lubricant to intermediate transfer bodies such as the intermediate transfer belt 21 and an intermediate transfer drum improves cleaning performance of a cleaning blade that cleans off residue such as remaining toner on an intermediate transfer member and improves transferability onto and from same.

Accordingly, the present invention can also be applied to a configuration in which an intermediate transfer member in an intermediate transfer system is regarded as an image carrier, and a lubricant supply device is provided for supplying lubricant to the intermediate transfer member.

Further, the content of the embodiments and modifications described above may be combined where possible.

SUMMARY

The content of the embodiments and modifications described above illustrate one aspect of the invention for solving the problem described in the RELATED ART section above, and the embodiments and the modifications are summarized as follows.

That is, one aspect of the present invention is a lubricant supply device for supplying lubricant to an image carrier of an image forming device, the lubricant supply device comprising: a block of solid lubricant; a lubricant supply member disposed opposing the block of solid lubricant, the lubricant supply member scraping lubricant from the block of solid lubricant and supplying the lubricant to the image carrier; and a spring applying a biasing force to the block of solid lubricant in a second direction inclined with respect to a first direction from the block of solid lubricant towards the lubricant supply member, a component of the biasing force in the first direction pushing the block of solid lubricant against the lubricant supply member, wherein positions of the spring and the block of solid lubricant relative to each other are such that, as the block of solid lubricant decreases due to the scraping by the lubricant supply member, the angle between the biasing force and the first direction decreases, and the component of the biasing force in the first direction increases.

According to another configuration of the lubricant supply device, the spring is a torsion coil spring that includes a coil and an arm that extends from one end of the coil, and the arm applies the biasing force to a second face of the block of solid lubricant opposite a first face thereof that faces the lubricant supply member.

According to another configuration of the lubricant supply device, when the block of solid lubricant is new, a connecting portion between the arm and the coil is closer than the second face to the lubricant supply member in the first direction.

According to another configuration of the lubricant supply device, the lubricant supply member is a rotating body, the block of solid lubricant is elongated along a rotation axis of the lubricant supply member, the biasing force includes a component Fz in the first direction and a component Fx in the longitudinal direction of the block of solid lubricant, and the block of solid lubricant and the arm are connected so that, as the block of solid lubricant decreases, the arm moves in a direction of decreasing torsion angle due to a restoring force of the torsion coil spring, and the block of solid lubricant moves along the longitudinal direction due to the component Fx applied from the arm.

According to another configuration of the lubricant supply device, the lubricant supply member is a rotating body, the block of solid lubricant is elongated along a rotation axis of the lubricant supply member, the torsion coil spring is disposed so an axial direction of the coil is perpendicular to the longitudinal direction of the block of solid lubricant, and the arm is bent in a direction towards the block of solid lubricant, and a portion from the bend to a tip of the arm is a point of application of the biasing force to the second face of the block of solid lubricant.

According to another configuration of the lubricant supply device, the lubricant supply member is a rotating body, the block of solid lubricant is elongated along a rotation axis of the lubricant supply member, and the torsion coil spring is disposed so an axial direction of the coil is a direction along the longitudinal direction of the block of solid lubricant.

According to another configuration of the lubricant supply device, $k \times \theta_1 < F_1 \times (1 - \cos \theta_1)$ where the spring constant of the torsion coil spring is $k$ (N/°), a torsion angle of the torsion coil spring when a direction of the biasing force applied to the block of solid lubricant by the torsion coil spring matches the first direction is $\phi_0$ (°), a torsion angle when the block of solid lubricant is new is $\phi_1$, which is greater than $\phi_0$, an angle obtained by subtracting $\phi_0$ from $\phi_1$ is $\theta_1$ (°), and the biasing force applied to the block of solid lubricant by the torsion coil spring when the angle is $\theta_1$ is $F_1$ (N).

According to another configuration of the lubricant supply device, the spring is a leaf spring or a line spring, and has a base end held by a body of the device and a free end, and the free end applies the biasing force to a second face of the block of solid lubricant opposite a first face thereof that faces the lubricant supply member.

According to another configuration of the lubricant supply device, when the block of solid lubricant is new, the base end is closer than the second face to the lubricant supply member in the first direction.

According to another configuration of the lubricant supply device, the lubricant supply member is a rotating body, the block of solid lubricant is elongated along a rotation axis of the lubricant supply member, the biasing force includes a component Fz in the first direction and a component Fx in the longitudinal direction of the block of solid lubricant, and the block of solid lubricant and the free end are connected so that, as the block of solid lubricant decreases, the free end moves due to a restoring force of the spring that works to return to an original shape of the spring, and the block of solid lubricant moves along the longitudinal direction due to the component Fx applied from the free end.

According to another configuration of the lubricant supply device, the lubricant supply member is a rotating body, the block of solid lubricant is elongated along a rotation axis of the lubricant supply member, and the spring, viewed from the first direction, is disposed so the base end and the free end are lined up along the longitudinal direction of the block of solid lubricant.

According to another configuration of the lubricant supply device, the lubricant supply member is a rotating body, the block of solid lubricant is elongated along a rotation axis of the lubricant supply member, and the spring, viewed from the first direction, is disposed so the base end and the free end are lined up in a direction perpendicular to both the first direction and the longitudinal direction of the block of solid lubricant.

According to another configuration of the lubricant supply device, a biasing force adjustment member is provided to a portion that corresponds to a point of application of the biasing force to the block of solid lubricant, the biasing force adjustment member being interposed between the spring and the block of solid lubricant, and the biasing force adjustment member has a shape that increases a gap a between the block of solid lubricant and the portion after the block of solid lubricant decreases.

According to another configuration of the lubricant supply device, the positions of the spring and the block of solid lubricant relative to each other are such that, when the component of the biasing force in the first direction is a pressing force P on the block of solid lubricant towards the lubricant supply member, the pressing force P is maximized as the block of solid lubricant approaches the end of its life due to the scraping.

According to another configuration of the lubricant supply device, the lubricant supply member is a rotating body, the block of solid lubricant is elongated along a rotation axis of the lubricant supply member, and the spring is disposed at at least two end portions at opposing ends of the block of solid lubricant in the longitudinal direction thereof.

According to another configuration of the lubricant supply device, the spring causes a moment about a predefined position to act on the block of solid lubricant as the biasing force in the second direction, and the positions of the spring and the block of solid lubricant relative to each other are such that, when the block of solid lubricant is new, the predefined position is closer to the lubricant supply member than the portion that corresponds to a point of application of the biasing force to the block of solid lubricant.

Further, another aspect of the present invention is an image forming device that forms an image on an image carrier, the image forming device comprising: a transfer unit that transfers an image formed on the image carrier to a transfer receiving member; a cleaning unit that contacts a surface of the image carrier after the transfer, and cleans the surface of the image carrier; and a lubricant supply device that supplies, to the image carrier, lubricant for decreasing friction between the surface of the image carrier and the cleaning unit, wherein the lubricant supply device comprises: a block of solid lubricant; a lubricant supply member disposed opposing the block of solid lubricant, the lubricant supply member scraping the lubricant from the block of solid lubricant and supplying the lubricant to the image carrier; and a spring applying a biasing force to the block of solid lubricant in a second direction inclined with respect to a first direction from the block of solid lubricant towards the lubricant supply member, a component of the biasing force in the first direction pushing the block of solid lubricant against the lubricant supply member, wherein positions of the spring and the block of solid lubricant relative to each other are such that, as the block of solid lubricant decreases due to the scraping by the lubricant supply member, the angle between the biasing force and the first direction decreases, and the component of the biasing force in the first direction increases.

According to another configuration of the image forming device, the image carrier is a photoreceptor or an intermediate transfer body used in intermediate transfer system.

According to another configuration of the image forming device, the image forming device further comprises: a levelling member that levels lubricant supplied to the image carrier, wherein the image carrier is a rotating member, and the cleaning unit, the lubricant supply unit, and the levelling member are disposed in this order around a rotation direction of the image carrier.

According to the configurations above, a component in a first direction of a biasing force on a block of solid lubricant from a spring, i.e., a pressing force from the block of solid lubricant to a lubricant supply member, is made to increase as the block of solid lubricant is decreased due to scraping of the lubricant supply member, and therefore it is possible to stabilize an amount of lubricant supplied to an image carrier over a long period of time without providing the rotation mechanism of a cam and with a simple spring configuration that does not greatly increase costs.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A lubricant supply device for supplying lubricant to an image carrier of an image forming device, the lubricant supply device comprising:
   a block of solid lubricant;
   a lubricant supply member disposed opposing the block of solid lubricant, the lubricant supply member scraping lubricant from the block of solid lubricant and supplying the lubricant to the image carrier; and
   a spring applying a biasing force to the block of solid lubricant in a second direction inclined with respect to a first direction from the block of solid lubricant towards the lubricant supply member, a component of the biasing force in the first direction pushing the block of solid lubricant against the lubricant supply member, wherein
   positions of the spring and the block of solid lubricant relative to each other are such that, as the block of solid lubricant decreases due to the scraping by the lubricant supply member, the angle between the biasing force and the first direction decreases, and the component of the biasing force in the first direction increases.

2. The lubricant supply device of claim 1, wherein the spring is a torsion coil spring that includes a coil and an arm that extends from one end of the coil, and the arm applies the biasing force to a second face of the block of solid lubricant opposite a first face thereof that faces the lubricant supply member.

3. The lubricant supply device of claim 2, wherein when the block of solid lubricant is new, a connecting portion between the arm and the coil is closer than the second face to the lubricant supply member in the first direction.

4. The lubricant supply device of claim 2, wherein
the lubricant supply member is a rotating body,
the block of solid lubricant is elongated along a rotation axis of the lubricant supply member,
the biasing force includes a component Fz in the first direction and a component Fx in the longitudinal direction of the block of solid lubricant, and
the block of solid lubricant and the arm are connected so that, as the block of solid lubricant decreases, the arm moves in a direction of decreasing torsion angle due to a restoring force of the torsion coil spring, and the block of solid lubricant moves along the longitudinal direction due to the component Fx applied from the arm.

5. The lubricant supply device of claim 2, wherein
the lubricant supply member is a rotating body,
the block of solid lubricant is elongated along a rotation axis of the lubricant supply member,
the torsion coil spring is disposed so an axial direction of the coil is perpendicular to the longitudinal direction of the block of solid lubricant, and
the arm is bent in a direction towards the block of solid lubricant, and a portion from the bend to a tip of the arm is a point of application of the biasing force to the second face of the block of solid lubricant.

6. The lubricant supply device of claim 2, wherein
the lubricant supply member is a rotating body,
the block of solid lubricant is elongated along a rotation axis of the lubricant supply member, and
the torsion coil spring is disposed so an axial direction of the coil is a direction along the longitudinal direction of the block of solid lubricant.

7. The lubricant supply device of claim 2, wherein $$k \times \theta_1 < F_1 \times (1 - \cos \theta_1)$$

where the spring constant of the torsion coil spring is k (N/°), a torsion angle of the torsion coil spring when a direction of the biasing force applied to the block of solid lubricant by the torsion coil spring matches the first direction is $\phi_0$ (°), a torsion angle when the block of solid lubricant is new is $\phi_1$, which is greater than $\phi_0$, an angle obtained by subtracting $\phi_0$ from $\phi_1$ is $\theta_1$ (°), and the biasing force applied to the block of solid lubricant by the torsion coil spring when the angle is $\theta_1$ is $F_1$ (N).

8. The lubricant supply device of claim 1, wherein
the spring is a leaf spring or a line spring, and has a base end held by a body of the device and a free end, and
the free end applies the biasing force to a second face of the block of solid lubricant opposite a first face thereof that faces the lubricant supply member.

9. The lubricant supply device of claim 8, wherein
when the block of solid lubricant is new, the base end is closer than the second face to the lubricant supply member in the first direction.

10. The lubricant supply device of claim 8, wherein
the lubricant supply member is a rotating body,
the block of solid lubricant is elongated along a rotation axis of the lubricant supply member,
the biasing force includes a component Fz in the first direction and a component Fx in the longitudinal direction of the block of solid lubricant, and the block of solid lubricant and the free end are connected so that, as the block of solid lubricant decreases, the free end moves due to a restoring force of the spring that works to return to an original shape of the spring, and the block of solid lubricant moves along the longitudinal direction due to the component Fx applied from the free end.

11. The lubricant supply device of claim 8, wherein
the lubricant supply member is a rotating body,
the block of solid lubricant is elongated along a rotation axis of the lubricant supply member, and
the spring, viewed from the first direction, is disposed so the base end and the free end are lined up along the longitudinal direction of the block of solid lubricant.

12. The lubricant supply device of claim 8, wherein
the lubricant supply member is a rotating body,
the block of solid lubricant is elongated along a rotation axis of the lubricant supply member, and
the spring, viewed from the first direction, is disposed so the base end and the free end are lined up in a direction perpendicular to both the first direction and the longitudinal direction of the block of solid lubricant.

13. The lubricant supply device of claim 1, wherein
a biasing force adjustment member is provided to a portion that corresponds to a point of application of the biasing force to the block of solid lubricant, the biasing force adjustment member being interposed between the spring and the block of solid lubricant, and
the biasing force adjustment member has a shape that increases a gap a between the block of solid lubricant and the portion after the block of solid lubricant decreases.

14. The lubricant supply device of claim 1, wherein
the positions of the spring and the block of solid lubricant relative to each other are such that, when the component of the biasing force in the first direction is a pressing force P on the block of solid lubricant towards the lubricant supply member, the pressing force P is maximized as the block of solid lubricant approaches the end of its life due to the scraping.

15. The lubricant supply device of claim 1, wherein
the lubricant supply member is a rotating body,
the block of solid lubricant is elongated along a rotation axis of the lubricant supply member, and
the spring is disposed at at least two end portions at opposing ends of the block of solid lubricant in the longitudinal direction thereof.

16. The lubricant supply device of claim 1, wherein
the spring causes a moment about a predefined position to act on the block of solid lubricant as the biasing force in the second direction, and
the positions of the spring and the block of solid lubricant relative to each other are such that, when the block of solid lubricant is new, the predefined position is closer to the lubricant supply member than a portion that corresponds to a point of application of the biasing force to the block of solid lubricant.

17. The lubricant supply device of claim 1, wherein the spring is configured such that, as the angle between the biasing force and the first direction decreases, the biasing force decreases.

18. An image forming device that forms an image on an image carrier, the image forming device comprising:
a transfer unit that transfers an image formed on the image carrier to a transfer receiving member;
a cleaning unit that contacts a surface of the image carrier after the transfer, and cleans the surface of the image carrier; and
a lubricant supply device that supplies, to the image carrier, lubricant for decreasing friction between the surface of the image carrier and the cleaning unit, wherein the lubricant supply device comprises:
a block of solid lubricant;
a lubricant supply member disposed opposing the block of solid lubricant, the lubricant supply member scraping the lubricant from the block of solid lubricant and supplying the lubricant to the image carrier; and
a spring applying a biasing force to the block of solid lubricant in a second direction inclined with respect to a first direction from the block of solid lubricant towards the lubricant supply member, a component of the biasing force in the first direction pushing the block of solid lubricant against the lubricant supply member, wherein
positions of the spring and the block of solid lubricant relative to each other are such that, as the block of solid lubricant decreases due to the scraping by the lubricant supply member, the angle between the biasing force and the first direction decreases, and the component of the biasing force in the first direction increases.

19. The image forming device of claim 18, wherein
the image carrier is a photoreceptor or an intermediate transfer body used in intermediate transfer system.

20. The image forming device of claim 18, further comprising:
a levelling member that levels lubricant supplied to the image carrier, wherein
the image carrier is a rotating member, and
the cleaning unit, the lubricant supply unit, and the levelling member are disposed in this order around a rotation direction of the image carrier.

* * * * *